United States Patent
Elazzouni et al.

(10) Patent No.: US 12,096,281 B2
(45) Date of Patent: Sep. 17, 2024

(54) RESOURCE BUNDLE FOR TIME SENSITIVE NETWORKING BRIDGE

(71) Applicant: QUALCOMM Incorporated, San Diego, CA (US)

(72) Inventors: Sherif Elazzouni, San Diego, CA (US); Ozcan Ozturk, San Diego, CA (US); Rajat Prakash, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/446,936

(22) Filed: Sep. 3, 2021

(65) Prior Publication Data
US 2023/0075864 A1 Mar. 9, 2023

(51) Int. Cl.
*H04W 28/24* (2009.01)
*H04W 28/08* (2023.01)
*H04W 72/04* (2023.01)
*H04W 72/044* (2023.01)
*H04W 72/23* (2023.01)

(52) U.S. Cl.
CPC ....... *H04W 28/24* (2013.01); *H04W 28/0975* (2020.05); *H04W 72/044* (2013.01); *H04W 72/23* (2023.01)

(58) Field of Classification Search
CPC .............. H04W 28/24; H04W 28/0975; H04W 28/0268; H04W 72/044; H04W 72/042; H04W 72/23; H04W 76/14; H04W 24/08; H04L 47/28; H04L 47/2416; H04L 47/801; H04L 47/283
See application file for complete search history.

(56) References Cited

U.S. PATENT DOCUMENTS

| | | | |
|---|---|---|---|
| 2018/0213508 A1* | 7/2018 | Chai | H04W 76/27 |
| 2020/0259896 A1* | 8/2020 | Sachs | H04J 3/0667 |
| 2020/0413424 A1* | 12/2020 | Fakoorian | H04W 76/36 |

(Continued)

FOREIGN PATENT DOCUMENTS

| | | |
|---|---|---|
| EP | 3937555 A1 | 1/2022 |
| WO | 2020148616 A1 | 7/2020 |
| WO | 2020199923 A1 | 10/2020 |

OTHER PUBLICATIONS

David G., et al., "End-to-end Optimized Joint Scheduling of Converged Wireless and Wired Time-Sensitive Networks", 2020 25th IEEE International Conference on Emerging Technologies and Factory Automation (ETFA), vol. 1, Sep. 8, 2020, pp. 222-229, XP033835746, DOI: 10.1109/ETFA46521.2020.9212049, Sec. II-B, figures 1-5, 7, Sec. II-B, Sees. IV-A and IV-B, Sec. V-A, Sec. v-c, Sec. VI-A.

(Continued)

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a first user equipment (UE) may transmit a request for a network device to establish a resource bundle, of resources to be used by nodes at hops in a time sensitive networking (TSN) bridge for TSN communications to a second UE, with a maximum latency for the TSN bridge. The first UE may transmit the TSN communications to the second UE via the TSN bridge. Numerous other aspects are described.

30 Claims, 16 Drawing Sheets

(56) References Cited

U.S. PATENT DOCUMENTS

| | | | | |
|---|---|---|---|---|
| 2021/0160879 | A1* | 5/2021 | Lin | H04W 72/0453 |
| 2021/0219357 | A1* | 7/2021 | Talebi Fard | H04L 47/724 |
| 2021/0352536 | A1* | 11/2021 | Prabhakar | H04W 28/0268 |
| 2021/0360647 | A1* | 11/2021 | Xu | H04W 72/56 |
| 2022/0021623 | A1* | 1/2022 | Liu | H04L 47/27 |
| 2022/0394647 | A1* | 12/2022 | Moon | H04J 3/0673 |
| 2022/0417972 | A1* | 12/2022 | Rossbach | H04W 72/20 |

OTHER PUBLICATIONS

Ericsson: "RAN Enhancements based on New QoS Related Parameters", 3GPP TSG-RAN WG2 #113bis-e, R2-2103429, vol. RAN WG2, No. Electronic Meeting, Apr. 12, 2021-Apr. 20, 2021, 10 Pages, Apr. 1, 2021, XP051992072, Sec. 2.1, Sec. 2.3, p. Sec. 5.
International Search Report and Written Opinion—PCT/US2022/075852—ISA/EPO—Nov. 21, 2022.

* cited by examiner

RESOURCE BUNDLE FOR TIME SENSITIVE NETWORKING BRIDGE

FIELD OF THE DISCLOSURE

Aspects of the present disclosure generally relate to wireless communication and to techniques and apparatuses for using a resource bundle for a time sensitive networking bridge.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting a request for a network device to establish a resource bundle, of resources to be used by nodes at hops in a time sensitive networking (TSN) bridge for TSN communications to a second UE, with a maximum latency for the TSN bridge. The method may include transmitting the TSN communications to the second UE via the TSN bridge.

Some aspects described herein relate to a method of wireless communication performed by a network device. The method may include receiving, from a first UE, a request for the network device to establish a resource bundle, of resources to be used at hops in a TSN bridge for TSN communications to a second UE, with a maximum latency for the TSN bridge. The method may include activating the resources of the resource bundle.

Some aspects described herein relate to a first UE for wireless communication. The first UE may include memory, one or more processors coupled to the memory, and instructions stored in the memory and executable by the one or more processors. The instructions may be executable by the one or more processors to cause the first UE to transmit a request for a network device to establish a resource bundle, of resources to be used by nodes at hops in a TSN bridge for TSN communications to a second UE, with a maximum latency for the TSN bridge. The instructions may be executable by the one or more processors to cause the first user equipment to transmit the TSN communications to the second UE via the TSN bridge.

Some aspects described herein relate to a network device for wireless communication. The network device may include memory, one or more processors coupled to the memory, and instructions stored in the memory and executable by the one or more processors. The instructions may be executable by the one or more processors to cause the network device to receive, from a first UE, a request for the network device to establish a resource bundle, of resources to be used at hops in a TSN bridge for TSN communications to a second UE, with a maximum latency for the TSN bridge. The instructions may be executable by the one or more processors to cause the network device to activate the resources of the resource bundle.

Some aspects described herein relate to a non-transitory computer-readable medium that stores one or more instructions for wireless communication by a first UE. The one or more instructions, when executed by one or more processors of the first UE, may cause the first UE to transmit a request for a network device to establish a resource bundle, of resources to be used by nodes at hops in a TSN bridge for TSN communications to a second UE, with a maximum latency for the TSN bridge. The one or more instructions, when executed by one or more processors of the first UE, may cause the first UE to transmit the TSN communications to the second UE via the TSN bridge.

Some aspects described herein relate to a non-transitory computer-readable medium that stores one or more instructions for wireless communication by a network device. The one or more instructions, when executed by one or more processors of the network device, may cause the network device to receive, from a first UE, a request for the network device to establish a resource bundle, of resources to be used at hops in a TSN bridge for TSN communications to a second UE, with a maximum latency for the TSN bridge. The one or more instructions, when executed by one or more processors of the network device, may cause the network device to activate the resources of the resource bundle.

Some aspects described herein relate to an apparatus for wireless communication. The apparatus may include means for transmitting a request for a network device to establish a resource bundle, of resources to be used by nodes at hops in a TSN bridge for TSN communications to another apparatus, with a maximum latency for the TSN bridge. The apparatus may include means for transmitting the TSN communications to the second UE via the TSN bridge.

Some aspects described herein relate to an apparatus for wireless communication. The apparatus may include means for receiving, from a first UE, a request for the network device to establish a resource bundle, of resources to be used at hops in a TSN bridge for TSN communications to a second UE, with a maximum latency for the TSN bridge. The apparatus may include means for activating the resources of the resource bundle.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
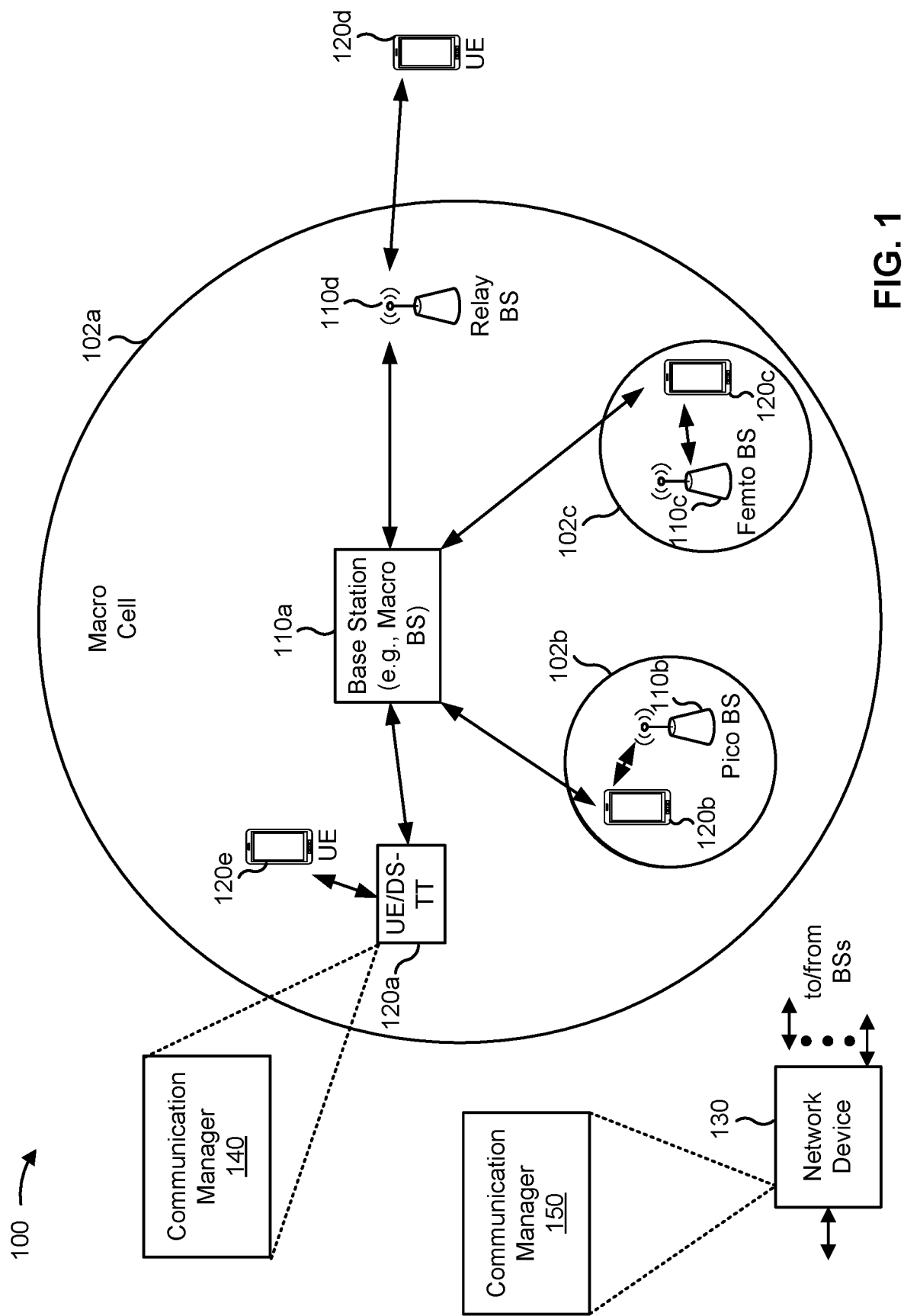
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller may couple to or communicate with a set of base stations 110 and may provide coordination and control for these base stations 110. The network controller may communicate with the base stations 110 via a backhaul communication link. The base stations 110 may communicate with one another directly or indirectly via a wireless or wireline backhaul communication link.

A network device 130 may be part of a core network or a logical TSN bridge for handling time-sensitive communications. The network device 130 may be a TSN application function (TSN-AF) that manages TSN functions. Alternatively, or additionally, the network device 130 may be a network-side TSN translator (NW-TT) that communicates with a DS-TT via base stations 110 and that communicates with a TSN-AF via one or more interfaces.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120) may include a communication manager 140. As described in more detail elsewhere herein, the communication manager 140 may transmit a request for a network device to establish a resource bundle, of resources to be used by nodes at hops in a time sensitive networking (TSN) bridge for TSN communications to a second UE, with a maximum latency for the TSN bridge. The communication manager 140 may transmit the TSN communications to the second UE via the TSN bridge. Additionally, or alternatively, the communication manager 140 may perform one or more other operations described herein.

In some aspects, a network device (e.g., network device 130) may include a communication manager 150. As described in more detail elsewhere herein, the communication manager 150 may receive, from a first UE, a request for the network device to establish a resource bundle, of resources to be used at hops in a TSN bridge for TSN communications to a second UE, with a maximum latency for the TSN bridge. The communication manager 150 may activate the resources of the resource bundle. Additionally, or alternatively, the communication manager 150 may perform one or more other operations described herein.

As indicated above, FIG. 1 is provided as an example. Other examples may differ from what is described with regard to FIG. 1.

Figure 2:
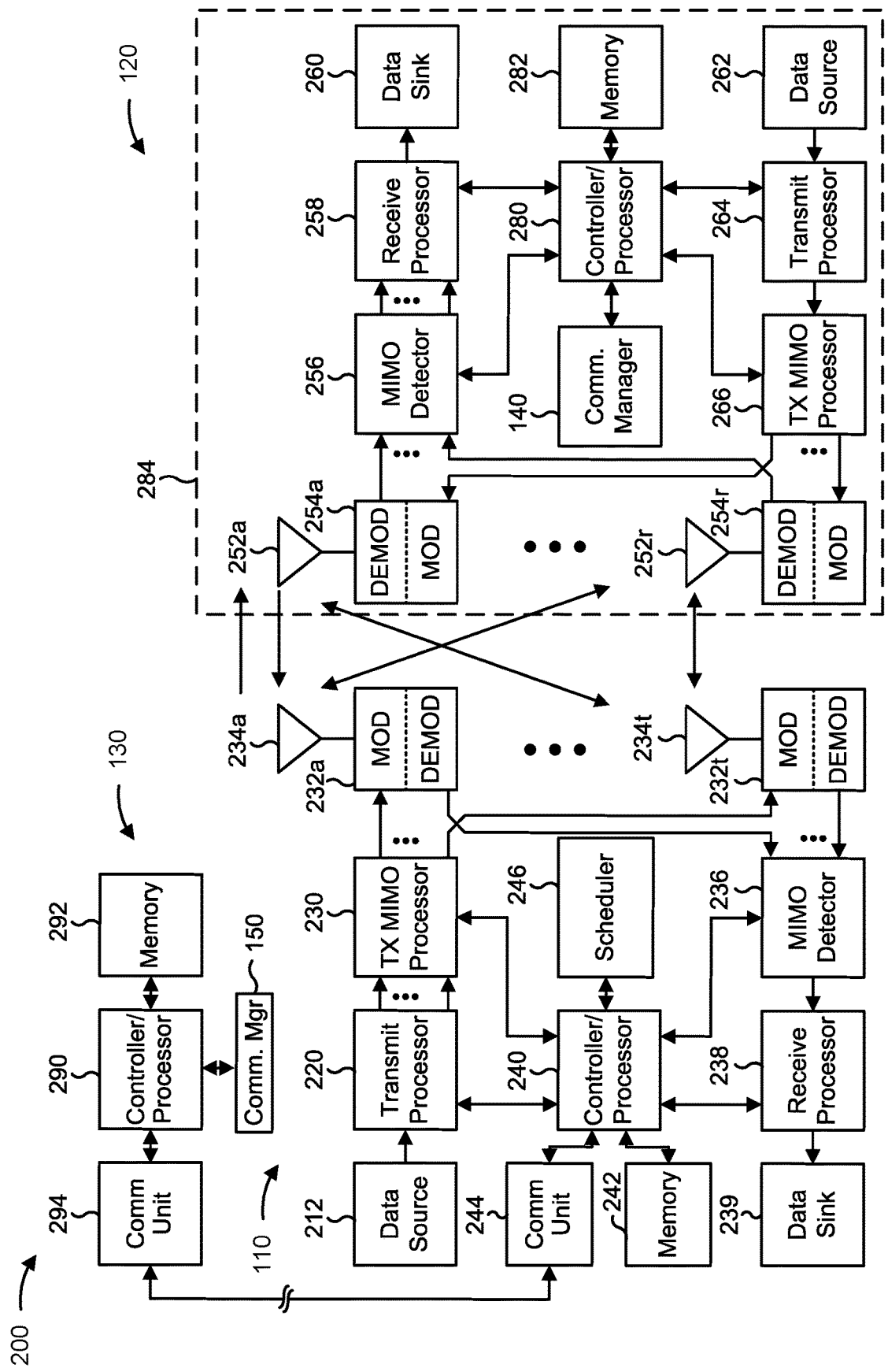
FIG. 2 is a diagram illustrating an example of a base station in communication with a user equipment (UE) in a wireless network, in accordance with the present disclosure.

FIG. 2 is a diagram illustrating an example 200 of a network device 130 that is in communication with another network device 130 and/or in communication with a UE 120 via base station 110 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network device 130 may include a communication unit 294, a controller/processor 290, and a memory 292. The network device 130 may include, for example, one or more devices in a core network. The network device 130 may communicate with another network device 130 or the base station 110 via the communication unit 294.

A network device 130 may be part of a core network or a logical TSN bridge for handling time-sensitive communications. The network device 130 may be a TSN application function (TSN-AF) that manages TSN functions. Alternatively, or additionally, the network device 130 may be a network-side TSN translator (NW-TT) that communicates with a DS-TT via base stations 110 and that communicates with a TSN-AF via one or more interfaces.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-16).

The controller/processor 240 of the base station 110, the controller/processor 280 of the UE 120, the controller/processor 290 of the network device 130, and/or any other component(s) of FIG. 2 may perform one or more techniques associated with using a resource bundle for a TSN bridge with a deterministic latency, such as a maximum end-to-end latency, as described in more detail elsewhere herein. In some aspects, a TSN application function (TSN-AF), a base station 110, or a network device in an NR core network is the network device 130, is included in the network device 130, or includes one or more components of the network device 130 shown in FIG. 2. For example, the controller/processor 240 of the base station 110, the controller/processor 280 of the UE 120, the controller/processor 290 of the network device 130, and/or any other component(s) of FIG. 2 may perform or direct operations of, for example, process 1300 of FIG. 13, process 1400 of FIG. 14, and/or other processes as described herein. The memory 242, the memory 282, and the memory 292 may store data and program codes for the base station 110, the UE 120, and the network device 130, respectively. In some examples, the memory 242, the memory 282, and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the network device 130, may cause the one or more processors, the UE 120, the base station 110, or the network device 130 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a first UE (e.g., UE 120) includes means for transmitting a request for a network device to establish a resource bundle, of resources to be used by nodes at hops in a TSN bridge for TSN communications to a second UE, with a maximum latency for the TSN bridge; and/or means for transmitting the TSN communications to the second UE via the TSN bridge. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network device 130 includes means for receiving, from a first UE, a request for the network device to establish a resource bundle, of resources to be used at hops in a TSN bridge for TSN communications to a second UE, with a maximum latency for the TSN bridge; and/or means for activating the resources of the resource bundle. In some aspects, the means for the network device 130 to perform operations described herein may include, for example, one or more of communication manager 150, controller/processor 290, memory 292, and communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
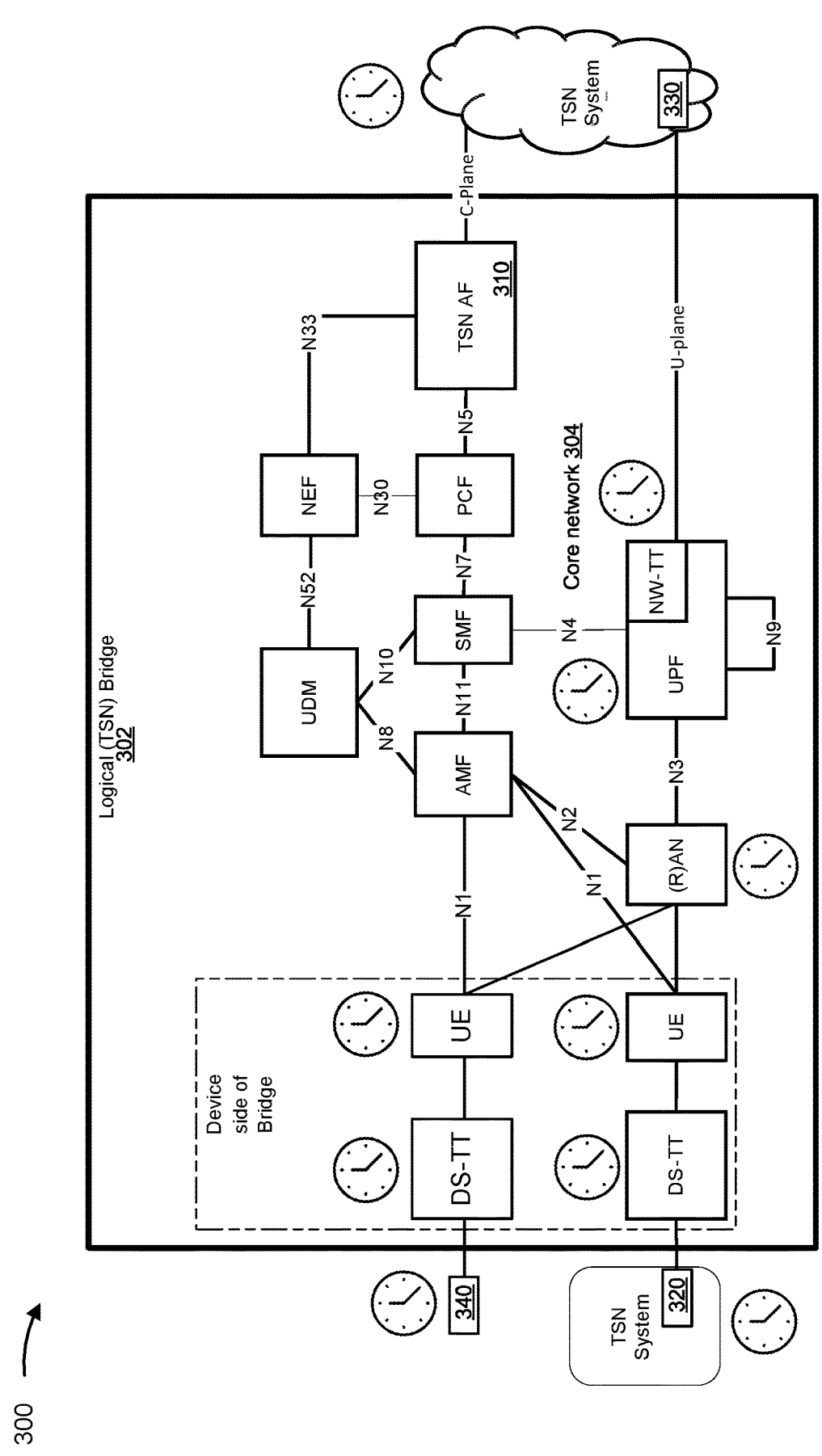
FIG. 3 is a diagram illustrating an example of a logical time sensitive networking (TSN) bridge between components of a TSN system, in accordance with the present disclosure.

FIG. 3 is a diagram illustrating an example 300 of a logical TSN bridge 302 between components of a TSN system, in accordance with the present disclosure. TSN focuses on converging information technology and industrial operational technology by extending and adapting existing Ethernet standards. A TSN system may include a TSN controller and one or more TSN components or nodes that operate according to a set of Ethernet standards defined in the Institute of Electrical and Electronics Engineers (IEEE) 802.1 TSN Task Group. These standards may be used to manage end-to-end latency for time-sensitive nodes. TSN systems may be integrated with NR networks. Example 300 shows a core NR network 304 that is part of the logical TSN bridge 302 between the components of the TSN system.

The logical TSN bridge 302 may be a "time-aware system." The logical TSN bridge 302 may include a TSN-AF 310 that controls the time-sensitive communications between the TSN systems. The TSN-AF 310 may be located in or may be associated with a network device, such as network device 130. The core network 304 used by the logical TSN bridge 302 may include a user plane function (UPF) that routes information between the TSN-AF 310 (on a network side of the logical TSN bridge 302) and a device side TSN translator (DS-TT) (on a device side of the logical TSN bridge 302). The DS-TT may translate or otherwise forward information from a TSN node to the TSN system using an associated wireless communication device, such as a UE 120. The UE 120 may communicate with the core network 304 via a base station 110 of a radio access network (RAN). The UPF may include or may be associated with a network side TSN translator (NW-TT) that acts as a hop in the logical TSN bridge 302. In order to support the exchange of TSN bridge information between the TSN-AF 310 and the core network 304, the TSN-AF 310 may use a port management information container for transparently transferring standardized and deployment-specific port management information between the TSN-AF 310 and the DS-TT and/or the NW-TT. The bridge capabilities in terms of latency, reliability, and throughput may be passed to the TSN working domain without exposing the internal 5G operation.

The core network 304 may include other components, such as a network exposure function (NEF) that helps other entities discover network services, a session management function (SMF) that supports the establishment, modification, and release of communication sessions, a policy control function (PCF) that provides a policy framework, a unified data management (UDM) function that stores user data and subscriber profile information, and an access and mobility management function (AMF) that acts as a termination point for non-access stratum (NAS) signaling and/or mobility management.

As shown by the clock icons at the TSN system and the logical TSN bridge 302, there is an amount of latency at each hop along a path from a transmitting TSN device 320 at an entrance of the logical TSN bridge 302 to a receiving TSN device 330 or a receiving TSN device 340 that is reached through the logical TSN bridge 302. Some TSN systems, such as industrial networks, may need to operate with deterministic networking. For example, an industrial network may need to have zero congestion, a bounded latency rather than average latency, a low packet loss rate, and deterministic periodic traffic (low stream throughput but large quantity (e.g., 50-70) of streams). The industrial network may also have a very strict requirement for a "survival time", or the maximum amount of time the application can withstand not receiving a communication packet. Such industrial networks may require a very high degree of robustness with respect to radio link failures, handovers, and other events.

TSN end stations, such as TSN device 320, TSN device 330, and TSN device 340, are not aware of the details of the logical TSN bridge 302 or the core network 304. These TSN devices only see the logical TSN bridge 302. The TSN devices also may not know a bridge Quality of Service (QoS) or an expected latency for the logical TSN bridge 302.

It may be necessary in TSN to quickly set up communication paths. In a scenario where a path is being set for an ongoing flow (possibly as a result of another path failure), the path may need to be setup end-to-end within a few milliseconds to avoid expiration of the survival time. Expiration of the survival time can often be a drastic outcome in industrial networks. Current standards and deployments cannot support this quick end-to-end path setup. Since a TSN packet at every uplink hop is buffered until a gNB can receive a buffer status report (BSR) and allocate a configured grant (CG) for transmission, the TSN packet may keep accumulating latency on every hop. This may make the latency to set up a path (and move the first packet) unacceptably large.

Furthermore, industrial traffic usually has some sporadic short-lived latency-sensitive bursty traffic. Large bursts are challenging for the network since they require a lot of immediate resources across communication paths. Serving these bursts can require the network to immediately allocate a large amount of resources to the bursts, which may cause temporary unavailability for other traffic flows. One solution would be to overbook resources to account for the bursts. However, that would quickly limit the network capacity and is very restrictive. Another solution would be to use resource coordination and traffic aware shapers in the logical TSN bridge 302 to break up a burst and to move the burst across the network in chunks over coordinated resources.

As indicated above, FIG. 3 is provided as an example. Other examples may differ from what is described with regard to FIG. 3.

Figure 4:
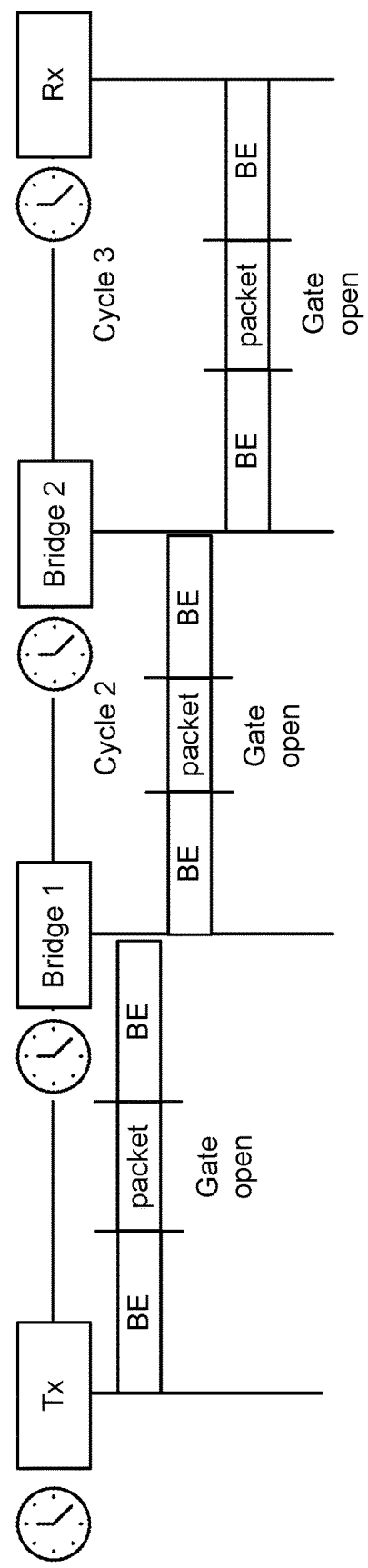
FIG. 4 is a diagram illustrating an example of gated scheduling, in accordance with the present disclosure.

FIG. 4 is a diagram illustrating an example 400 of gated scheduling, in accordance with the present disclosure.

Example 400 shows an example of a network with two TSN bridges that are time synchronized. A central controller may provision gating schedules using the TSN bridges. The gates may open for a certain time period for packets, in between bounded latency periods. The bounded latency periods may include "best effort" (BE) traffic that the network is not to prioritize over other communications with more sensitive QoS metrics such as latency or packet loss. The network may do its "best effort" to serve that traffic with reasonable QoS metrics but not at the expense of higher priority, more stringent traffic. The gating schedules and the bounded end-to-end latency periods may provide for deterministic end-to-end latency. The gated scheduling may also involve pre-emption, traffic shapers, stream reservation, and stream filtering. As a result, transmitters that use the network may provide information about when data may arrive at the network, and the network may provide information to the transmitters about an expected deterministic behavior or latency for the network.

As indicated above, FIG. 4 is provided as an example. Other examples may differ from what is described with regard to FIG. 4.

Figure 5:
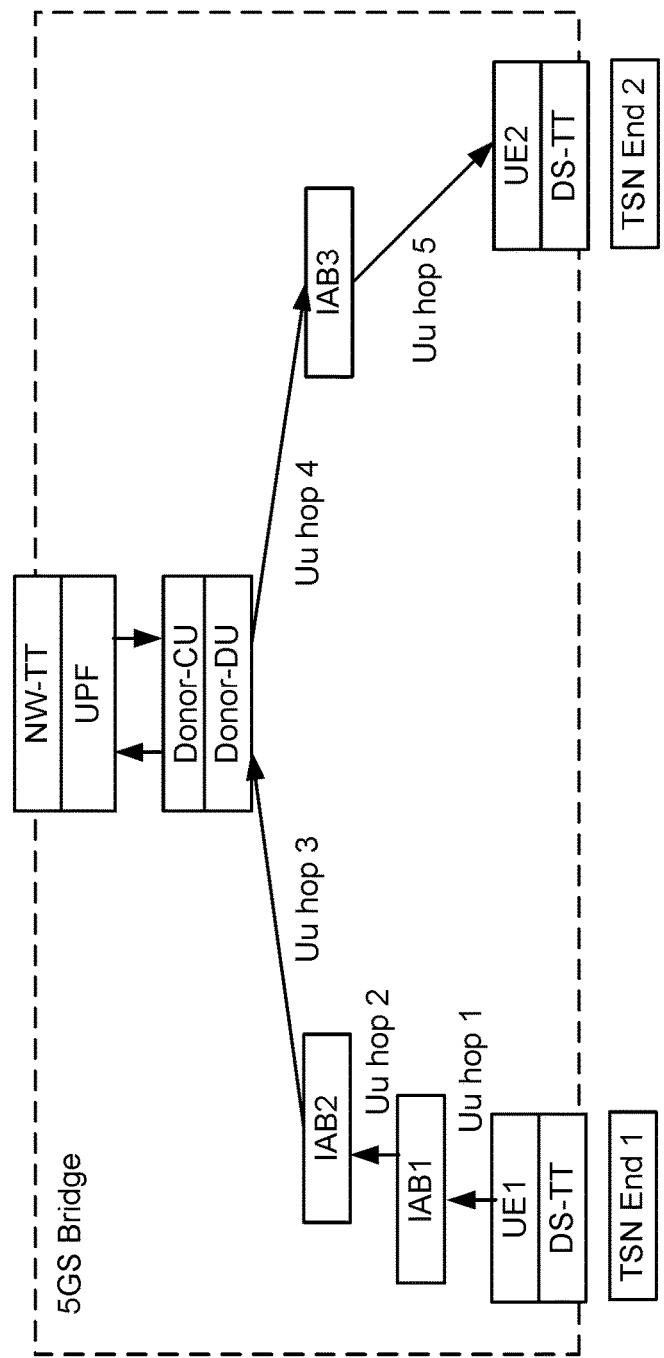
FIG. 5 is a diagram illustrating an example of multiple hops in a 5G bridge, in accordance with the present disclosure.

FIG. 5 is a diagram illustrating an example 500 of multiple hops in a 5G bridge, in accordance with the present disclosure.

5G (and even 6G) deployments in industrial networks may involve multiple hops, especially for mmWave bands such as FR2. As shown by the 5G bridge in example 500, the multiple hops may be part of an integrated access backhaul (IAB) deployment with multiple backhaul hops to a central unit (CU) via a distributed unit (DU). The multiple hops may also be part of a UE-UE deployment (e.g., wireless programmable logic controller (PLC) and a robotic arm), where a TSN packet from a source UE is transmitted over multiple IAB hops on the uplink to a gNB, which forwards the TSN packet on the downlink to the destination UE. Such TSN flows do not have a level of centralization or resource coordination with current standards and deployments.

As indicated above, FIG. 5 is provided as an example. Other examples may differ from what is described with regard to FIG. 5.

Figure 6:
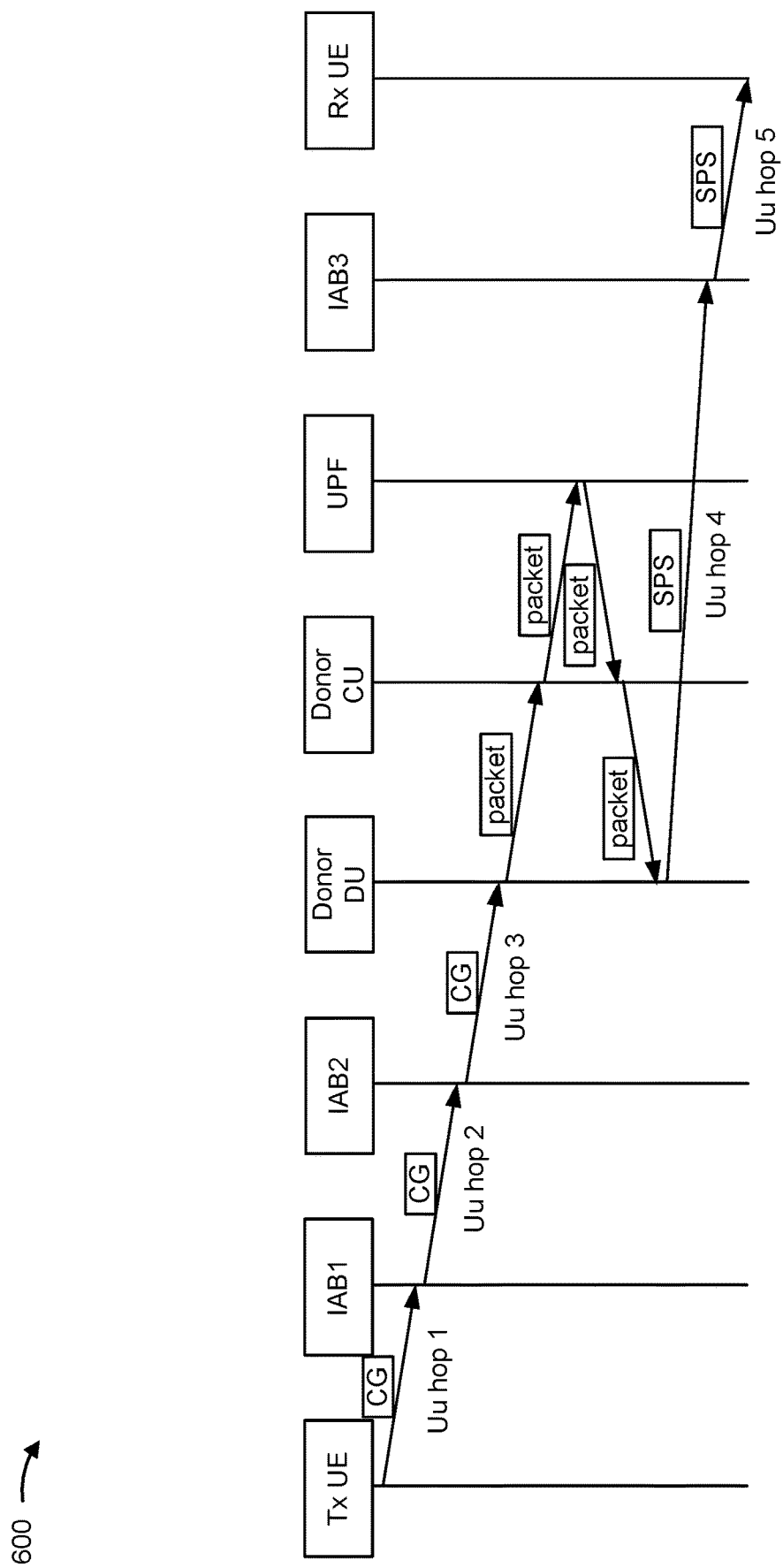
FIG. 6 is a diagram illustrating an example of uncoordinated latency, in accordance with the present disclosure.

FIG. 6 is a diagram illustrating an example 600 of uncoordinated latency, in accordance with the present disclosure. Example 600 shows a flow diagram for a TSN packet through the multi-hop 5G deployment described in connection with FIG. 5.

The multi-hop 5G deployment shown by example 500 in FIG. 5 lacks a deterministic worst-case latency bounding capability. 5G currently does not support deterministic latency over multi-hop deployments. Resource provisioning may be uncoordinated over different Uu hops. Example 600 shows, for Uu hops 1-5, CG instances from the transmitting UE to the Donor-DU, packet transmission within the 5G core network to the UPF via the Donor-CU, and SPS instances to the receiving UE. Configured and dynamic grants are uncoordinated, causing latency to build up as the TSN packet moves upstream and waits for the BSR to reach the next DU. This means that the 5GS bridge maximum latency may be potentially both high and random, which is unacceptable for a TSN system. A TSN end station may need to know the maximum deterministic delay for a TSN bridge, which may include a 5GS bridge.

While a base station or other network component may attempt to coordinate some resources, there is no standardized method to jointly provision a bundle of end-to-end resources. Individual implementations of CG and SPS resources by each MAC scheduler are uncoordinated. The individual implementations make end-to-end latency difficult to calculate, lack efficient signaling needed to maintain operation, and lack interoperability. The individual implementations make it harder to predict an end-to-end latency, detect periodic traffic, and assign the proper resources. There is currently no direct way for an IAB implementation to identify a single flow over multiple hops to properly coordinate a single resource to that flow.

As indicated above, FIG. 6 is provided as an example. Other examples may differ from what is described with regard to FIG. 6.

Figure 7:
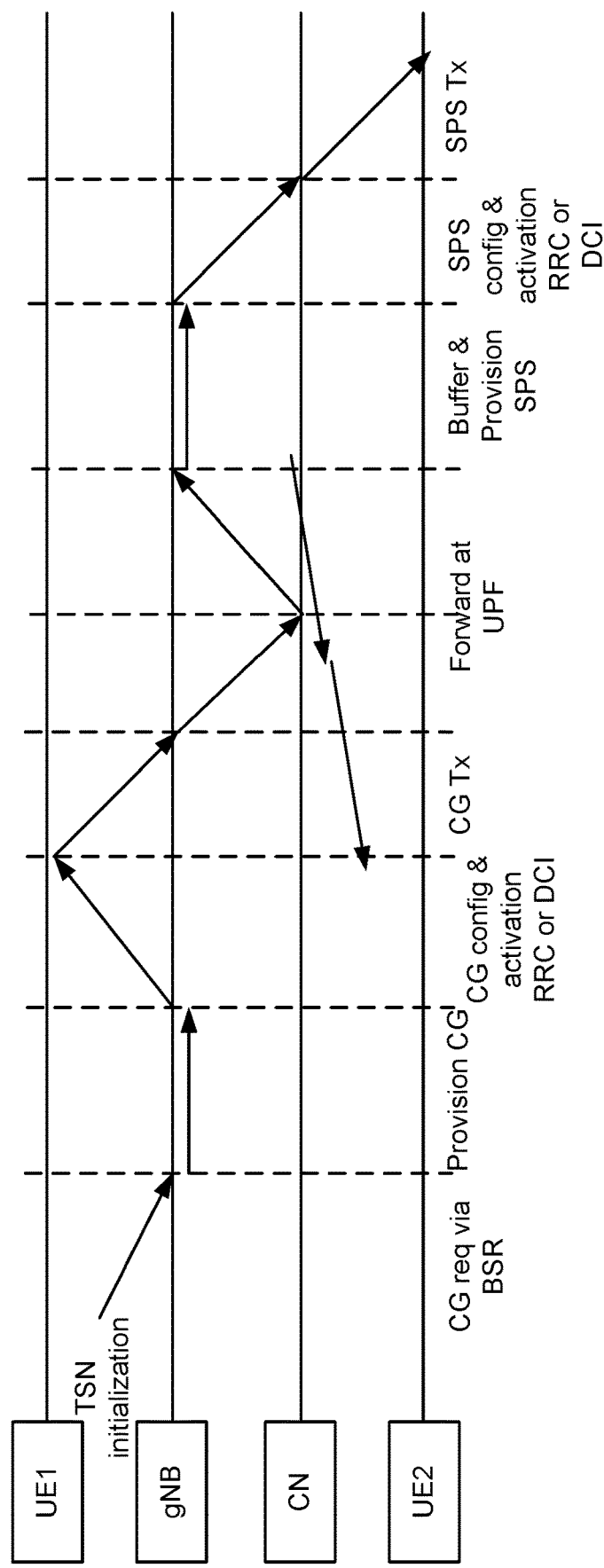
FIG. 7 is a diagram illustrating an example of a timing of a multi-hop deployment, in accordance with the present disclosure.

FIG. 7 is a diagram illustrating an example 700 of a timing of a multi-hop deployment, in accordance with the present disclosure.

Example 700 shows a timing for a two-hop deployment via a gNB and a core network (CN) after TSN is initialized for transmission of a TSN packet via UE1 to UE2. There is a time for UE1 to request a CG from the gNB via a BSR. There is a time for the gNB to provision the CG and transmit the CG via RRC or downlink control information (DCI) to UE1. The provisioning and activation of the CG may cause latency buildup that violates survival time constraints. UE1 may then use the CG instance to transmit the TSN packet to the gNB, which forwards the packet to the UPF. The gNB may then buffer the TSN packet and provision an SPS. The gNB may alert UE2 to the SPS. The buffering of the TSN packet and the provisioning and activation of the SPS may also cause latency buildup that violates the survival time constraints. The gNB may then use the SPS instance to transmit the TSN packet to UE2. Furthermore, there is currently no mechanism for deactivating all of the resources once the TSN flow terminates. This may further cause inefficient resource provisioning, because many grants may remain activated long after the traffic associated with the grant has stopped. This may affect not only TSN communications, but P2P communications within a cell or low latency traffic over an IAB (e.g., gaming, extended reality, video calling).

As indicated above, FIG. 7 is provided as an example. Other examples may differ from what is described with regard to FIG. 7.

Figure 8:
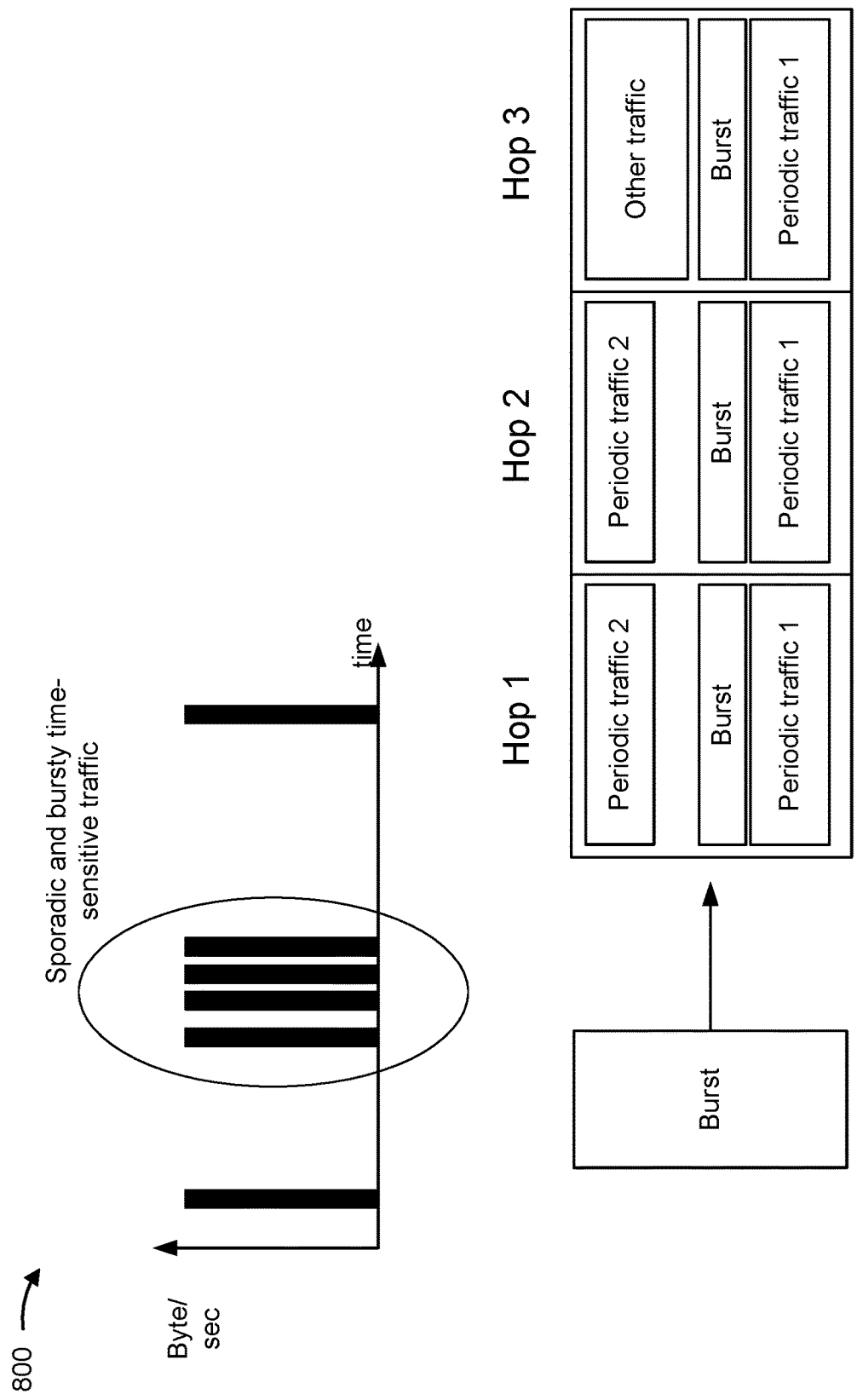
FIG. 8 is a diagram illustrating an example of absorbing sporadic bursts, in accordance with the present disclosure.

FIG. 8 is a diagram illustrating an example 800 of absorbing sporadic bursts, in accordance with the present disclosure.

Example 800 shows sporadic and bursty time-sensitive traffic produced by a device, such as a camera, sensors, or augmented reality. Large bursts can degrade performance of the network and may cause service unavailability. However, over-provisioning to absorb such sporadic bursts would be a waste of network resources. A TSN system may rely on the use of a traffic aware shaper (TAS) to rapidly absorb or smooth large bursts over multiple hops and rapidly release those resources back to the network. The TASs may break up a burst and transmit the burst in chunks to minimize the peak bandwidth, while not extending the latency. However, if resources for multiple hops are not coordinated, a bottleneck capacity for large bursts will not be known beforehand and there is no way for a transmitting device to absorb or smooth the traffic to avoid large delays caused by the bottleneck (Hop 3).

As indicated above, FIG. 8 is provided as an example. Other examples may differ from what is described with regard to FIG. 8.

Figure 9:
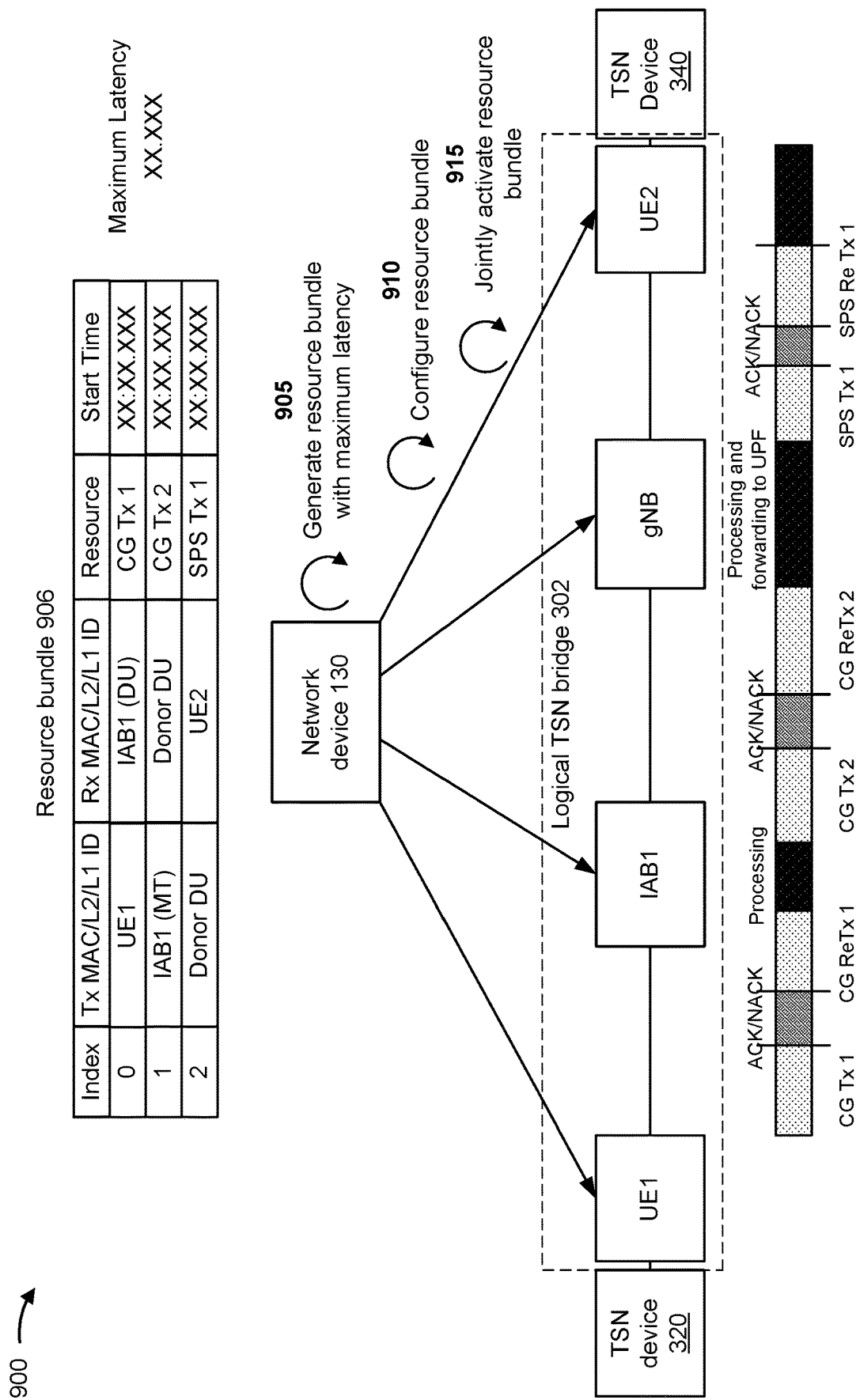
FIG. 9 is a diagram illustrating an example of a resource bundle with a deterministic latency, in accordance with the present disclosure.

FIG. 9 is a diagram illustrating an example 900 of a resource bundle with a deterministic latency, in accordance with the present disclosure.

According to various aspects described herein, a network device (e.g., network device 130) may provision a coordinated end-to-end resource bundle to natively support TSN over multi-hop networks, including TSN networks that are integrated with a 5G core network or a 5GS bridge. The network device may be a TSN-AF, a 5G core network device, or a base station (e.g., gNB). There may be multiple CG and semi-persistent scheduling (SPS) configurations spanning across multiple UEs and multiple IAB nodes. The resource bundle may be a semi-static grouping of CG and SPS instances that are jointly provisioned, optimized, configured, activated, and/or deactivated. The network device may generate, for the resource bundle, a resource list (e.g., resource list-ID) that identifies a pair of network components at each hop and a resource (e.g., CG instance, SPS instance) for the hop. The resource list may identify resources across multiple DUs and across multiple UEs. The resource bundle may provision resources such that the CG or SPS instance at hop N starts after the CG or SPS instance at hop N−1 and any time needed for retransmission via a dynamic grant. The resource bundle may emulate the effects of TSN gating over 5G network hops.

By provisioning a resource bundle with a maximum end-to-end latency, the network device may allow for seamless integration between the TSN domain and the 5G core network while providing a deterministic latency from a transmitting TSN device to a receiving TSN device. The resource bundle may provide for cut-through transmission of TSN traffic with no congestion. The resource bundle may also provide for quick end-to-end path activation before survival time expiration.

The network device may jointly bundle resources as a group by radio resource control (RRC) signaling via two levels. A Level 1 group configuration may configure the parameters that are common for all of the resources, such as a periodicity, logical channel restrictions, a priority level, and/or an application level end-to-end maximum latency. A Level 2 UE specific configuration may configure the physical parameters that may be specific to a single UE, such as physical resources, power control, and/or a redundancy version. By coordinating resources as a resource bundle with a deterministic bound on the multi-hop latency of a TSN packet, the network device may report the multi-hop deterministic latency to transmitting TSN devices as the logical TSN bridge delay or the 5GS bridge delay (after adding core network latency). In some aspects, one or more resources for the resource bundle may be sidelink resources (e.g., sidelink grants, PC5 sidelink CGs). This may be beneficial for extended reality, wearables, and out-of-coverage UEs.

In some aspects, a transmitting TSN device or a receiving TSN device may request end-to-end resources (usage of a resource bundle). The request may be transmitted to the network device via a medium access control control element (MAC CE) or RRC signaling. The request may allow the TSN device to rapidly utilize coordinated resources along a communication path.

Example 900 shows a network device (e.g., network device 130) that may generate and activate a resource bundle with a deterministic latency. The deterministic latency may be predetermined or predicted to be a fixed amount of latency. That is, the deterministic latency may be a maximum latency for a TSN packet traveling through the resource bundle.

As shown by reference number 905, the network device 130 may generate the resource bundle, shown as resource bundle 906 in example 900. The resource bundle 906 may include a resource (e.g., CG type 2 instance, SPS instance) for each hop (identified by an index) and a timing (e.g., start time) for the resource, such as CG Tx 1, CG Tx 2, and SPS Tx 1. The resource bundle 906 may list pairs of nodes that the network device 130 has selected for each hop in a TSN bridge, such as the logical TSN bridge 302. The start time may indicate when an initial use of the resource is to start. For example, the resource bundle 906 may indicate a start time that is an absolute time or a relative time. In example 900, the start time for a first resource (e.g., CG Tx 1) is a time relative to when the CG is received by UE1. The network device 130 may select the start time for a second resource (e.g., CG Tx 2) such that there is a fixed amount of time from the start of the first resource. The fixed amount of time may account for the first occasion for the CG Tx 1, any time variance (gated time) due to traffic conditions, an acknowledgement (ACK) or negative acknowledgement (NACK), an occasion for UE1 to retransmit CG Tx 1 if necessary, and a time for any processing at the mobile terminal (MT) side of IAB 1. The start time for the third resource (e.g., SPS Tx 1) may account for the first occasion for the CG Tx 2, any time variance (gated time) due to traffic conditions, an ACK/NACK, an occasion for IAB1 to retransmit CG Tx 2 if necessary, and a time for any processing involving the UPF.

The network device 130 may calculate a maximum end-to-end latency for the resource bundle 906 that further accounts for the first occasion for the SPS Tx 1, any time variance (gated time) due to traffic conditions, an ACK/NACK, an occasion for the gNB to retransmit CG Tx 2 if necessary, and a time for any processing by UE2. The network device 130 may account for other conditions, non-radio component delays, events, configurations, or capabilities of the nodes that implement the resource bundle. As a result, the network device 130 may be able to guarantee a maximum latency for TSN systems that need a deterministic latency.

The network device 130 may select the resources for the resource bundle 906 (from among multiple different paths) and a timing for the resources such that the use of the resources achieves a target maximum end-to-end latency for a TSN packet. Start times may be determined in order to provide a gating effect for a TSN flow. The network device 130 may configure the resource bundle 906 for cut-through transmission with bounded latency and zero congestion loss. The resource bundle may indicate one or more physical resource blocks (PRBs) associated with power control parameters or a redundancy level. The network device 130 may provide information to UEs and other network nodes about the target maximum end-to-end latency.

UEs, TSN components, or other network components (e.g., IAB on behalf of a UE or TSN component) may request use of the resource bundle 906 or another resource bundle via a MAC CE or an RRC message. The network device 103 may provide virtual IDs for resource bundles to the UEs. The network device 130 may also periodically use the resource bundle 906 or determine to use the resource bundle 906 based at least in part on traffic conditions, network topology, and/or UE capabilities.

As shown by reference number 910, the network device 130 may configure the nodes with information associated with the resource bundle 906, such as resources and a timing for each resource. As shown by reference number 915, the network device 130 may then activate the nodes to use the resource bundle 906. The network device 130 may jointly activate the nodes for fast end-to-end path activation before the survival time for an application or the TSN system expires. The network device 130 may use DCI for fast activation of the resource bundle 906. The network device 130 may also activate nodes individually or use RRC signaling to activate the nodes to use the resource bundle 906. The network device 130 may also individually or jointly deactivate use of the resource bundle 906.

The network device 130 may use RRC signaling to configure and optimize the use of the resource bundle 906. The network device 130 may use a group configuration (Level 1) and/or a UE-specific configuration (Level 2). For example, the network device 130 may configure a timing of the resources that has a periodicity that is the same for all CG and SPS instances (since they carry the same payload). The network device 130 may use RRC signaling to establish a resource list index (e.g., ResourceListIndex) for a CG-SPS resource list. The network device 130 may use signaling (e.g., ResourceList_Add, ResourceList_Release, ResourceList_Modify) to dynamically change a resource list. The network device 130 may use RRC signaling to configure configured scheduling radio network temporary identifiers (CS-RNTIs), a number of HARQ processes (e.g., nrofHARQ-Processes), or a HARQ process ID offset (e.g., harq-ProcID-offset). The network device 130 may also configure physical resources, CG timers, power control parameters, MCSs, or other parameters for the nodes in association with the use of the resource bundle 906.

In some aspects, the network device 10 may, by coordination and joint provisioning/activation/cancellation of a resource bundle, cause a multi-hop network to efficiently absorb a high volume low-latency burst without over-provisioning resources or allowing QoS degradation of other flows. The network device 130 may know a bottleneck capacity for a whole flow (e.g., Hop 3 in example 800 of FIG. 8) and request that the transmitter shape or smooth the burst by spreading the burst over a longer time period, so as not to overload the bottleneck.

As indicated above, FIG. 9 is provided as an example. Other examples may differ from what is described with regard to FIG. 9.

Figure 10:
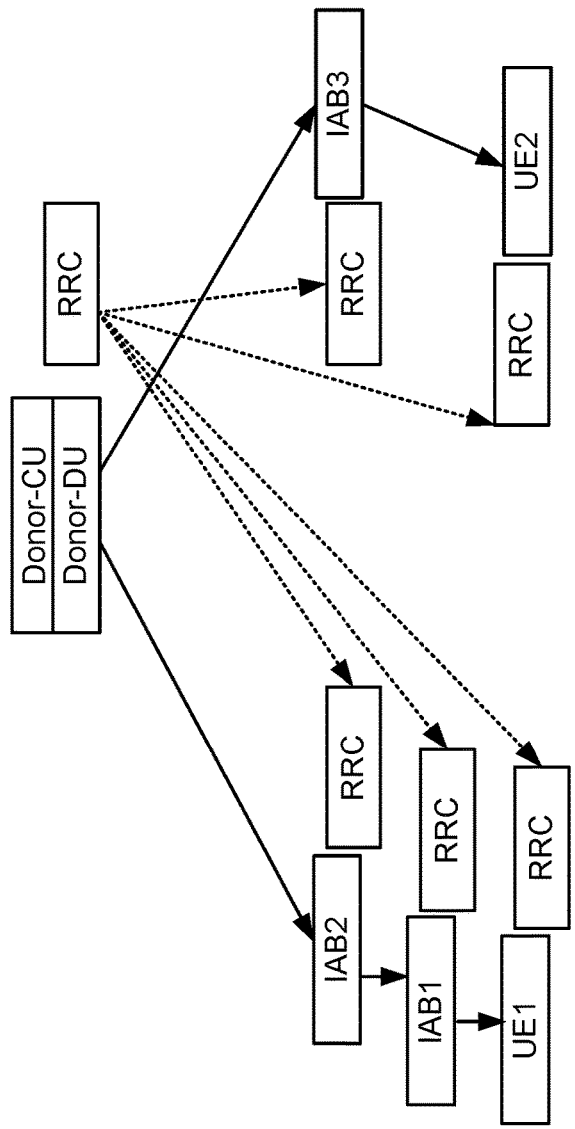
FIG. 10 is a diagram illustrating an example of joint activation or deactivation of nodes for a resource bundle, in accordance with the present disclosure.

FIG. 10 is a diagram illustrating an example 1000 of joint activation or deactivation of nodes for a resource bundle, in accordance with the present disclosure.

The network device 130 may activate use of the resource bundle 906 in at least two ways. In a first way, the network device 130 may transmit an indication (e.g., configuration, configuration index) to use the resource bundle 906 to nodes of a nearest hop, and those nodes may propagate the indication to nodes along other hops. In a second way, the network device 130 may use RRC signaling, a new MAC CE, or group DCI to simultaneously (as a group or nearly simultaneously) activate use of the resource bundle 906 for each node. RRC signaling may be used for activation if a resource has not been pre-configured.

The network device 130 may also use the first way or the second way to deactivate use of the resource bundle 906. In some aspects, the network device 130 may use RRC signaling, a new MAC CE, or group DCI to quickly deactivate the use of the resource bundle 906. In some aspects, the resource bundle 906 may be associated with a timer such that use of the resource bundle 906 is deactivated upon expiration of the timer. The timer may be used for bursty traffic and may be configured based at least in part on a time needed to serve a data burst. A timer duration may be indicated in an initial configuration or at activation.

As indicated above, FIG. 10 is provided as an example. Other examples may differ from what is described with regard to FIG. 10.

Figure 11:
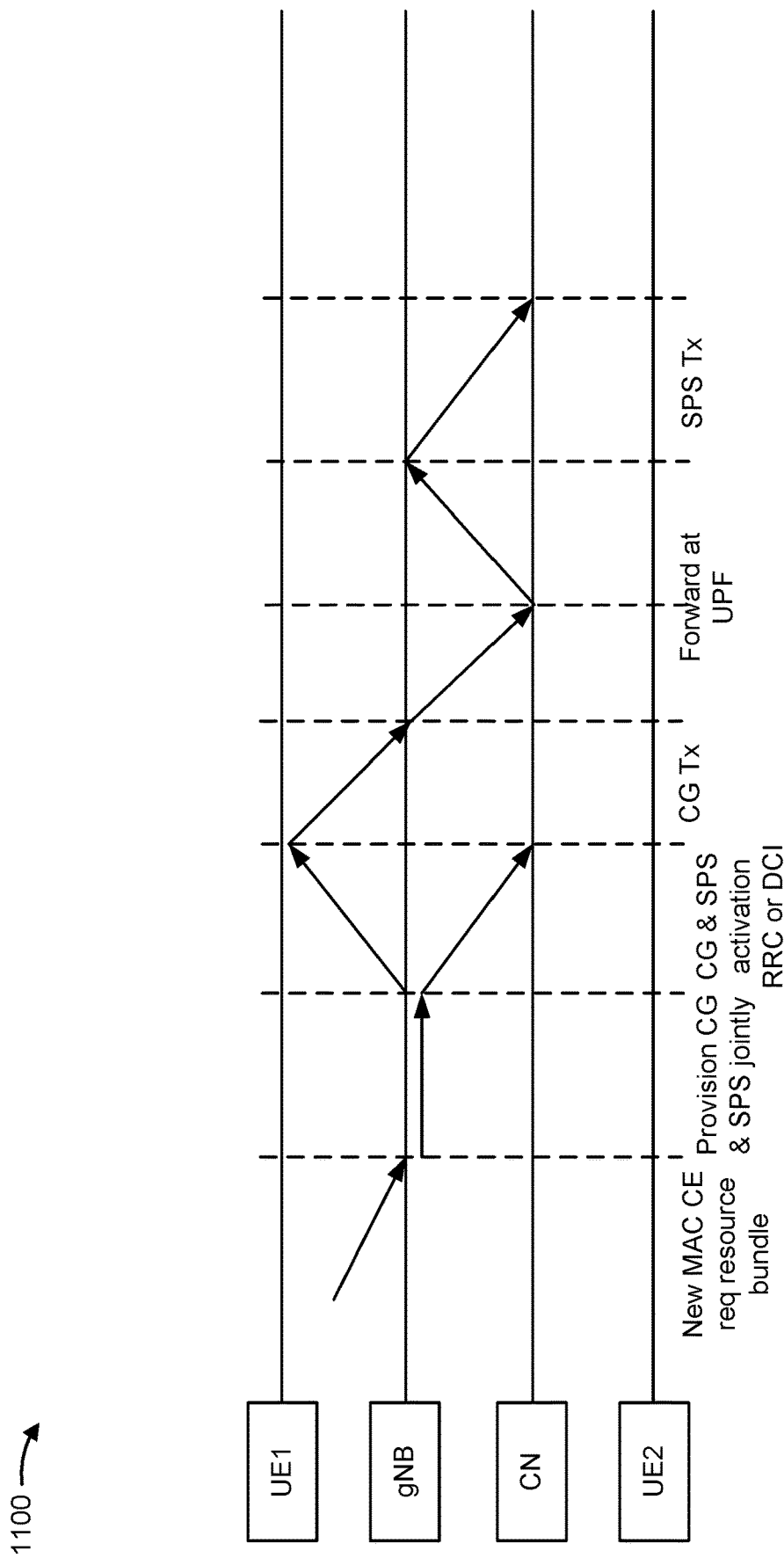
FIG. 11 is a diagram illustrating an example of a timing of a multi-hop deployment that used a resource bundle, in accordance with the present disclosure.

FIG. 11 is a diagram illustrating an example 1100 of a timing of a multi-hop deployment that used a resource bundle, in accordance with the present disclosure. Example 1100 is a timing diagram similar to the timing diagram of example 700 of FIG. 7.

In contrast to the timing diagram of example 700, the timing diagram of example 1100 shows that, upon request for a resource bundle (e.g., using a new MAC CE), the gNB may provision both the CG instance and the SPS instance, jointly. In this way, latency may be saved, as a later provisioning of the SPS instance is not necessary. The timing diagram of example 1100 is shorter in time than the timing diagram of example 900.

As indicated above, FIG. 11 is provided as an example. Other examples may differ from what is described with regard to FIG. 11.

Figure 12:
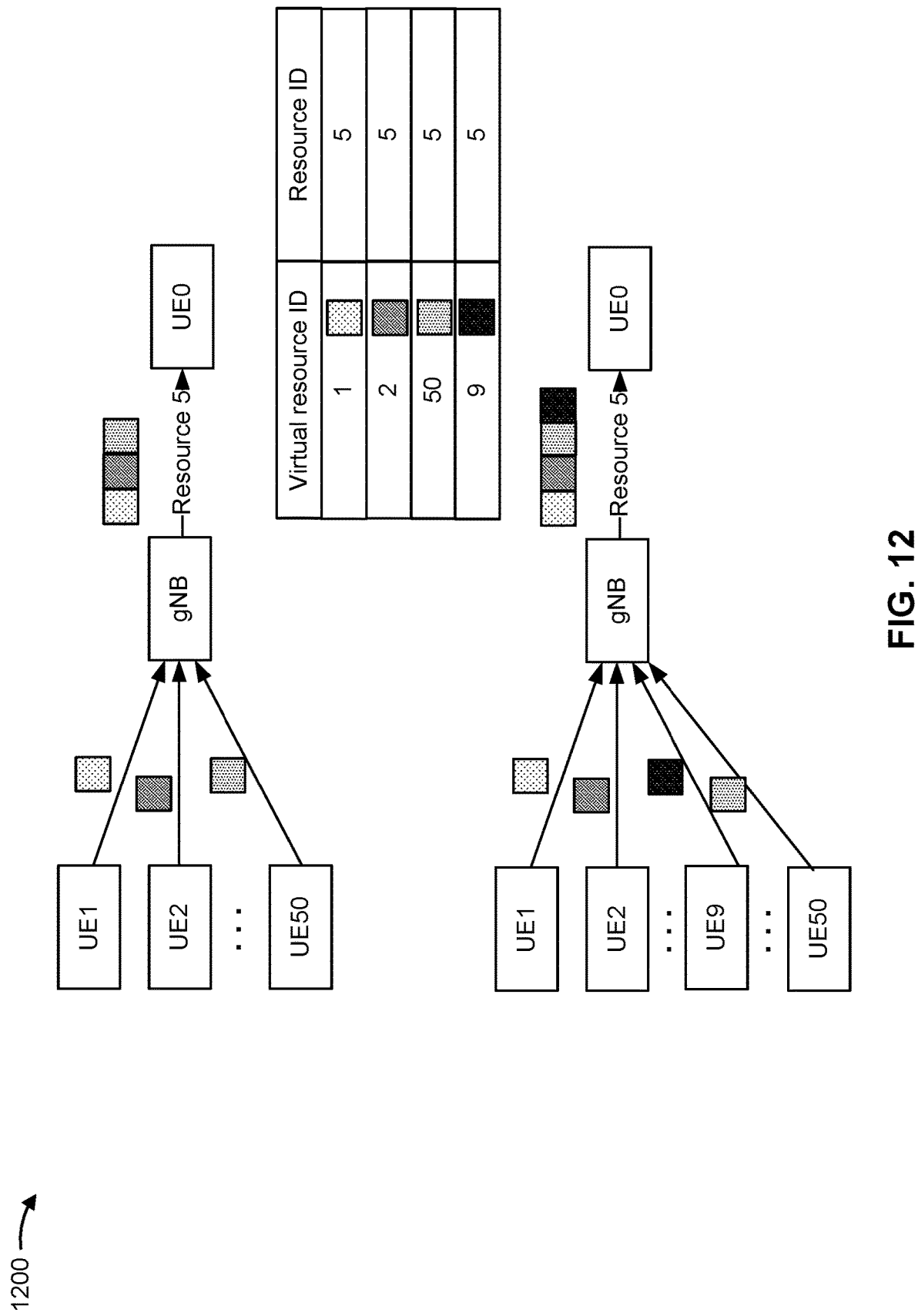
FIG. 12 is a diagram illustrating an example of reusing resources of a resource bundle, in accordance with the present disclosure.

FIG. 12 is a diagram illustrating an example 1200 of reusing resources of a resource bundle, in accordance with the present disclosure.

The resources described herein are physical resources, and physical resources may be shared among multiple resource bundles. In some aspects, the network device 130 may use existing resource bundles for a new request for a resource bundle (e.g., via a MAC CE) and thus resources of a new resource bundle may include resources that belong to an existing resource bundle. To facilitate use of existing resource bundles, the network device may assign resources (identified by resource IDs) used by UEs to be virtual resources, with virtual resource IDs. The network device 130 may map the virtual (logical) resource IDs to (physical) resource IDs. The mapping between virtual resources and physical resources may be transparent to the UE or the TSN device requesting the resource bundle.

Example 1200 shows UE1, UE2, and UE50 having dedicated CG instances to the gNB and sharing an SPS instance (resource ID 5) to UE0. The traffic for UE1, UE2, and UE50 are multiplexed on the SPS instance. The network device 130 may use virtual resource IDs for UE1, UE2, and UE50 and map these virtual resource IDs to resource ID 5. This may indicate that resource ID 5 is used by UE1, UE2 and UE50. The SPS instance identified by resource ID 5 may be part of one or more existing resource bundles. Each UE may see a dedicated virtual resource bundle that is available for end-to-end transmission.

UE9 may request a resource bundle to connect to UE0 using a MAC CE that includes a TSN pre-configured profile ID (pre-configured through protocol data unit (PDU) session establishment). The profile ID may map to time sensitive communications assistance information (TSCAI), known by the network device 130, that includes latency information, burst size information, and/or a periodicity. The network device 130 may use RRC signaling to reconfigure the existing resource bundle. The network device 130 may configure and activate a CG instance to carry UE9 traffic and reconfigure the existing SPS to allow for multiplexing of the UE9 traffic into the existing SPS instance. This may include mapping a virtual resource ID 9 for UE9 to resource ID 5. The network device 130 may multiplex new traffic for UE9 with traffic for UE1, UE2, and UE50 on resource ID 5. Alternatively, if no SPS instance exists, a resource-bundle with CG-SPS can be quickly configured and activated to carry the UE9 traffic. If resources are already configured with RRC signaling, the network device 130 may use DCI to activate the CG instance and the SPS instance for UE9.

As indicated above, FIG. 12 is provided as an example. Other examples may differ from what is described with regard to FIG. 12.

Figure 13:
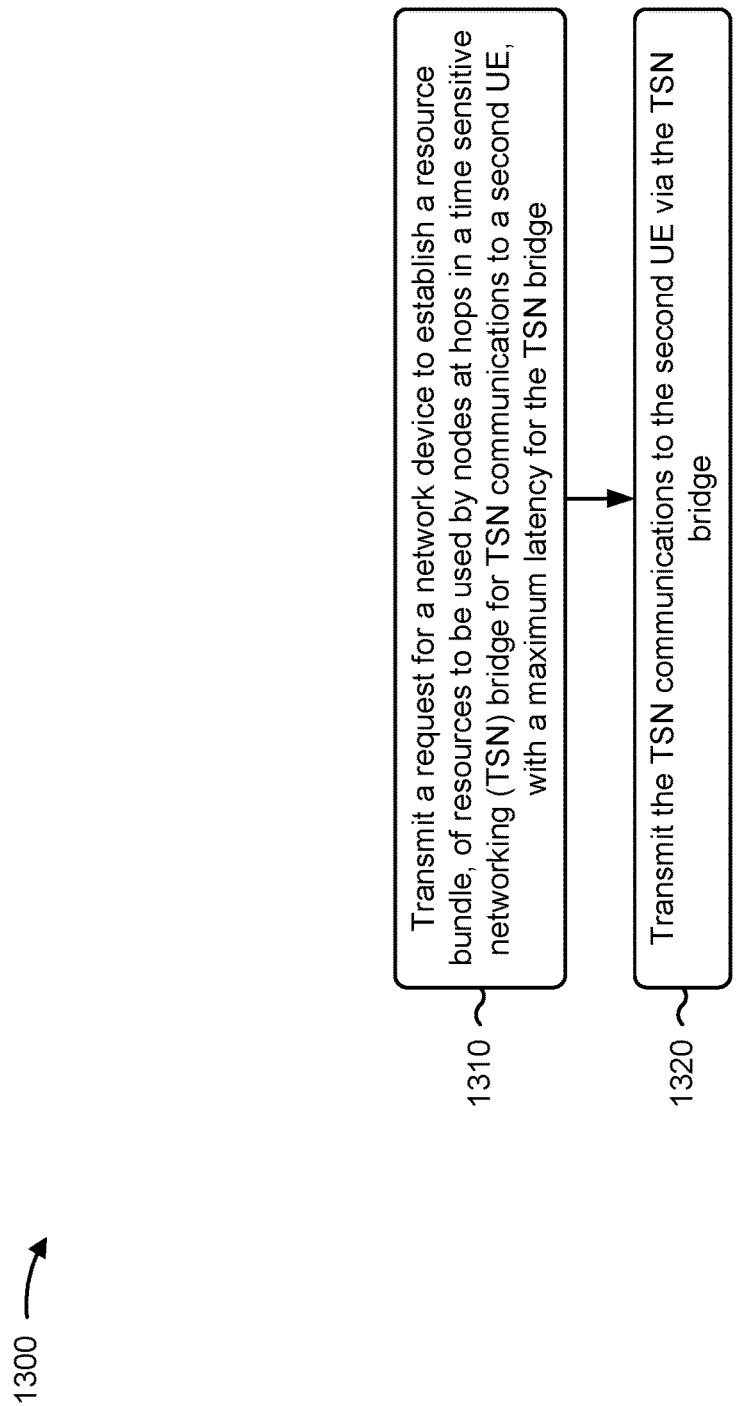
FIG. 13 is a diagram illustrating an example process performed, for example, by a first UE, in accordance with the present disclosure.

FIG. 13 is a diagram illustrating an example process 1300 performed, for example, by a first UE, in accordance with the present disclosure. Example process 1300 is an example where the UE (e.g., UE 120) performs operations associated with using a resource bundle for a TSN bridge.

As shown in FIG. 13, in some aspects, process 1300 may include transmitting a request for a network device to establish a resource bundle, of resources to be used by nodes at hops in a TSN bridge for TSN communications to a second UE, with a maximum latency for the TSN bridge (block 1310). For example, the UE (e.g., using communication manager 140 and/or transmission component 1504 depicted in FIG. 15) may transmit a request for a network device to establish a resource bundle, of resources to be used by nodes at hops in a TSN bridge for TSN communications to a second UE, with a maximum latency for the TSN bridge, as described above.

As further shown in FIG. 13, in some aspects, process 1300 may include transmitting the TSN communications to the second UE via the TSN bridge (block 1320). For example, the UE (e.g., using communication manager 140 and/or transmission component 1504 depicted in FIG. 15) may transmit the TSN communications to the second UE via the TSN bridge, as described above.

Process 1300 may include additional aspects, such as any single aspect or any combination of aspects described below and/or in connection with one or more other processes described elsewhere herein.

In a first aspect, the resource bundle identifies a pair of consecutive nodes for each hop and a timing for a resource used between the pair of consecutive nodes.

In a second aspect, alone or in combination with the first aspect, the transmitting the request includes transmitting the request via a MAC CE.

In a third aspect, alone or in combination with one or more of the first and second aspects, the transmitting the request includes transmitting the request via RRC signaling.

In a fourth aspect, alone or in combination with one or more of the first through third aspects, process 1300 includes receiving a message to adjust transmission of the TSN communications, and adjusting the transmission of the TSN communications based at least in part on the message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
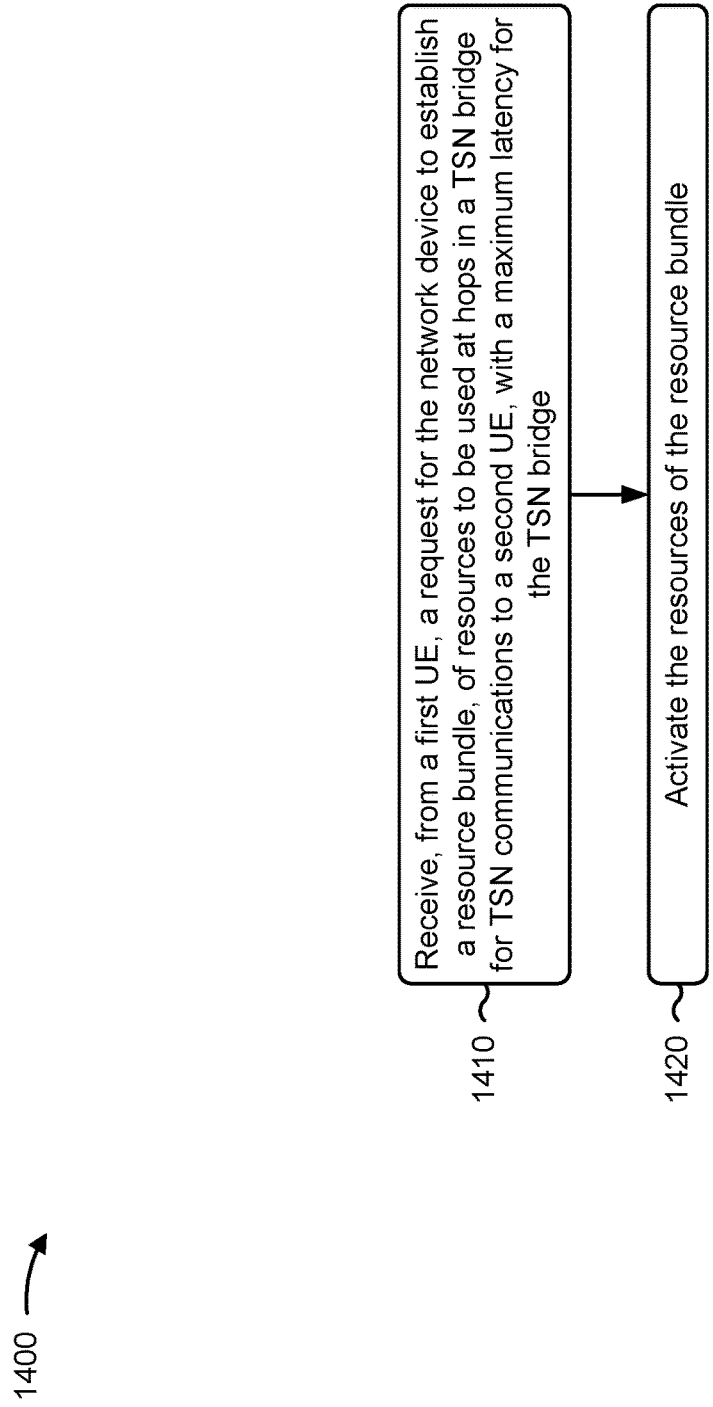
FIG. 14 is a diagram illustrating an example process performed, for example, by a network device, in accordance with the present disclosure.

FIG. 14 is a diagram illustrating an example process 1400 performed, for example, by a network device, in accordance with the present disclosure. Example process 1400 is an example where the network device (e.g., network device 130) performs operations associated with using a resource bundle for a TSN bridge.

As shown in FIG. 14, in some aspects, process 1400 may include receiving, from a first UE, a request for the network device to establish a resource bundle, of resources to be used at hops in a TSN bridge for TSN communications to a second UE, with a maximum latency for the TSN bridge (block 1410). For example, the network device (e.g., using communication manager 150 and/or reception component 1602 depicted in FIG. 16) may receive, from a first UE, a request for the network device to establish a resource bundle, of resources to be used at hops in a TSN bridge for TSN communications to a second UE, with a maximum latency for the TSN bridge, as described above.

As further shown in FIG. 14, in some aspects, process 1400 may include activating the resources of the resource bundle (block 1420). For example, the network device (e.g., using communication manager 150 and/or activation component 1608 depicted in FIG. 16) may activate the resources of the resource bundle, as described above.

Process 1400 may include additional aspects, such as any single aspect or any combination of aspects described below and/or in connection with one or more other processes described elsewhere herein.

In a first aspect, the resource bundle identifies a pair of consecutive nodes for each hop and a timing for a resource used between each pair of consecutive nodes.

In a second aspect, alone or in combination with the first aspect, the resource used between each pair of consecutive nodes includes a CG instance or an SPS instance.

In a third aspect, alone or in combination with one or more of the first and second aspects, the timing for the resource used between each pair of consecutive resources includes a starting time for use of the resource.

In a fourth aspect, alone or in combination with one or more of the first through third aspects, the timing is based at least in part on one or more of a periodicity, a priority level, a logical channel restriction, or an application level end-to-end maximum latency.

In a fifth aspect, alone or in combination with one or more of the first through fourth aspects, a resource used between a given pair of consecutive nodes includes one or more PRBs associated with power control parameters or a redundancy level.

In a sixth aspect, alone or in combination with one or more of the first through fifth aspects, a resource used between a given pair of consecutive nodes includes one or more PRBs associated with a configured grant timer value that contributes to the maximum latency.

In a seventh aspect, alone or in combination with one or more of the first through sixth aspects, a resource used between a given pair of consecutive nodes includes one or more PRBs associated with an MCS.

In an eighth aspect, alone or in combination with one or more of the first through seventh aspects, a resource used between a given pair of consecutive nodes includes one or more PRBs associated with a HARQ process.

In a ninth aspect, alone or in combination with one or more of the first through eighth aspects, process 1400 includes configuring the resources of the resource bundle, via RRC signaling, to set up the resource bundle.

In a tenth aspect, alone or in combination with one or more of the first through ninth aspects, process 1400 includes configuring the resource bundle to be a virtual resource bundle by mapping one or more of the resources of the resource bundle to one or more virtual resources of the virtual resource bundle, and the activating the resources of the resource bundle includes activating the one or more virtual resources of the virtual resource bundle.

In an eleventh aspect, alone or in combination with one or more of the first through tenth aspects, the activating the one or more virtual resources of the virtual resource bundle includes multiplexing the TSN communications on a resource mapped to a virtual resource.

In a twelfth aspect, alone or in combination with one or more of the first through eleventh aspects, process 1400 includes receiving a MAC CE indicating a virtual resource to activate, and the activating the one or more virtual resources of the virtual resource bundle includes activating the virtual resource based at least in part on the MAC CE.

In a thirteenth aspect, alone or in combination with one or more of the first through twelfth aspects, the receiving the request includes receiving the request via a MAC CE.

In a fourteenth aspect, alone or in combination with one or more of the first through thirteenth aspects, the activating the resources of the resource bundle includes jointly activating the resources via DCI.

In a fifteenth aspect, alone or in combination with one or more of the first through fourteenth aspects, the receiving the request includes receiving the request via RRC signaling from the first UE or from another node in the TSN bridge.

In a sixteenth aspect, alone or in combination with one or more of the first through fifteenth aspects, the activating the resources of the resource bundle includes transmitting a MAC CE to one or more nodes associated with the resource bundle.

In a seventeenth aspect, alone or in combination with one or more of the first through sixteenth aspects, the activating the resources of the resource bundle includes transmitting DCI or group DCI to one or more nodes associated with the resource bundle.

In an eighteenth aspect, alone or in combination with one or more of the first through seventeenth aspects, process 1400 includes transmitting a cancellation message to one or more nodes associated with the resource bundle via a MAC CE or group DCI.

In a nineteenth aspect, alone or in combination with one or more of the first through eighteenth aspects, process 1400 includes transmitting, to the first UE, a message to adjust transmission of the TSN communications with respect to the maximum latency of the TSN bridge.

In a twentieth aspect, alone or in combination with one or more of the first through nineteenth aspects, process 1400 includes configuring the resource bundle with a timer such that the resource bundle terminates upon expiration of the timer.

In a twenty-first aspect, alone or in combination with one or more of the first through twentieth aspects, one or more of the resources of the resource bundle include a sidelink grant.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
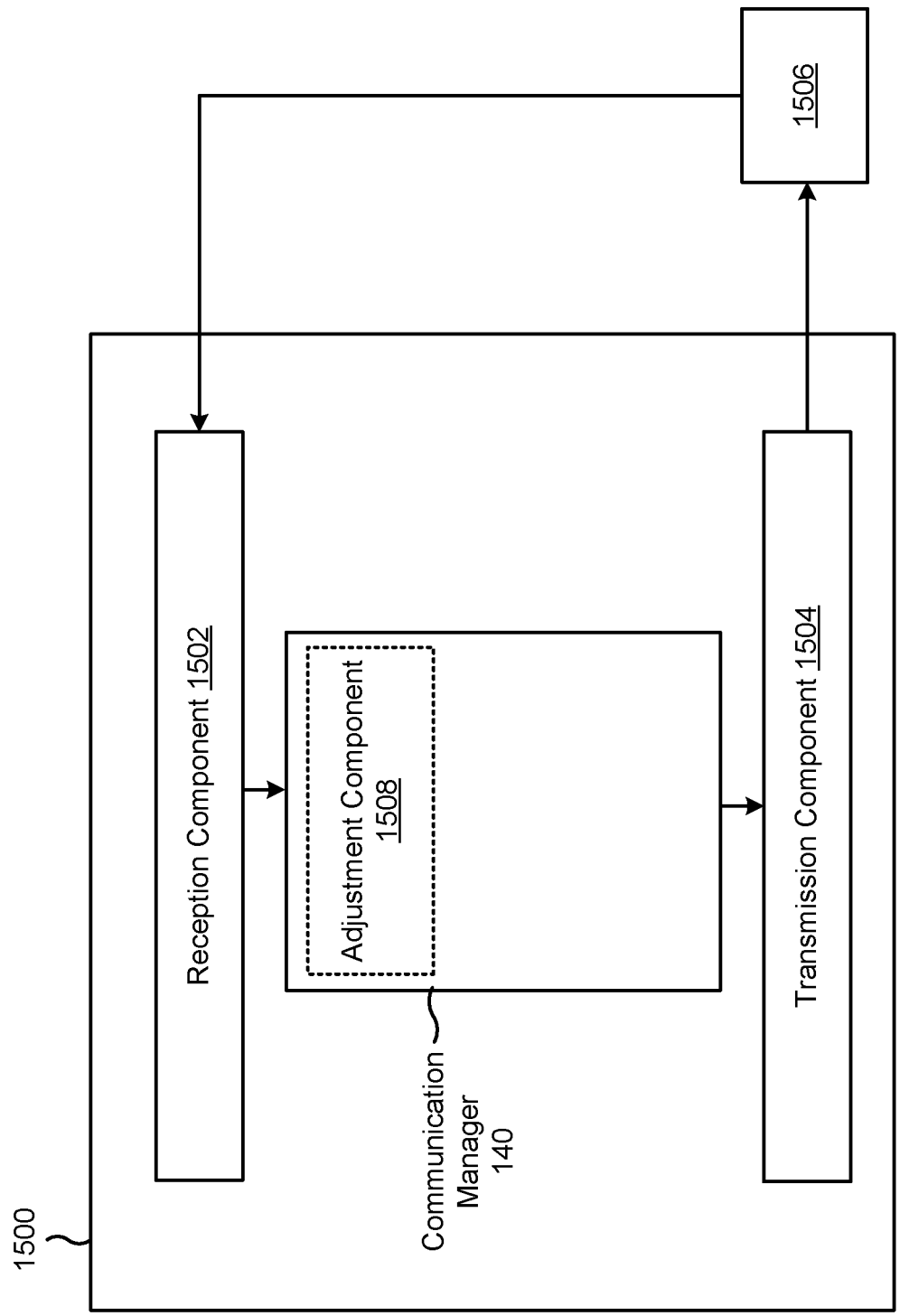
FIGS. 15-16 are diagrams of example apparatuses for wireless communication, in accordance with the present disclosure.

FIG. 15 is a diagram of an example apparatus 1500 for wireless communication. The apparatus 1500 may be a first UE (e.g., UE 120), or a first UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, network device, or another wireless communication device) using the reception component 1502 and the transmission component 1504. As further shown, the apparatus 1500 may include the communication manager 140. The communication manager 140 may include an adjustment component 1508, among other examples.

In some aspects, the apparatus 1500 may be configured to perform one or more operations described herein in connection with FIGS. 1-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the first UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the first UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the first UE described in connection with FIG. 2. In some aspects, the transmission component 1504 may be co-located with the reception component 1502 in a transceiver.

The transmission component 1504 may transmit a request for a network device to establish a resource bundle, of resources to be used by nodes at hops in a TSN bridge for TSN communications to a second UE, with a maximum latency for the TSN bridge. The transmission component 1504 may transmit the TSN communications to the second UE via the TSN bridge.

The reception component 1502 may receive a message to adjust transmission of the TSN communications. The adjustment component 1508 may adjust the transmission of the TSN communications based at least in part on the message.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
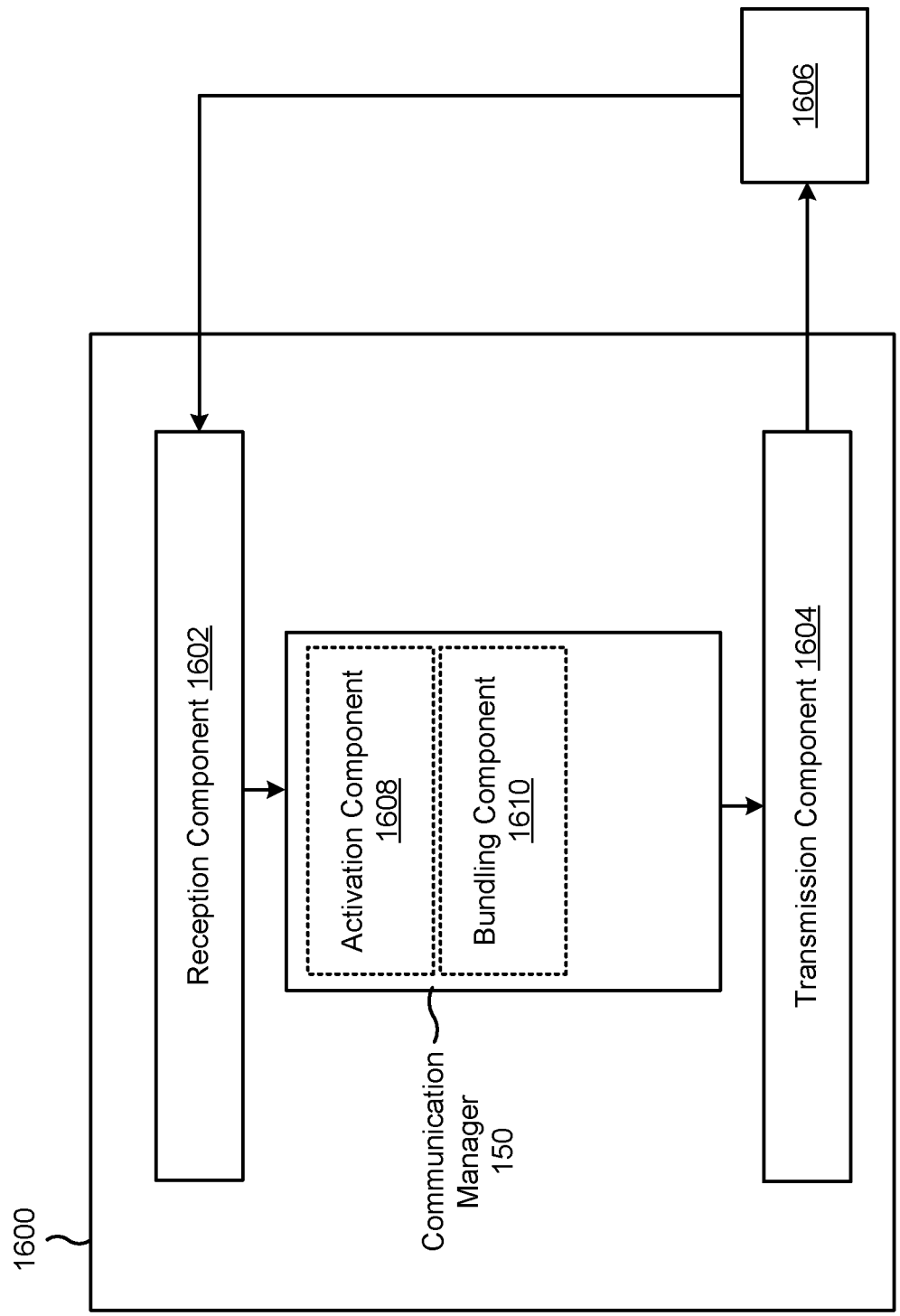

FIG. 16 is a diagram of an example apparatus 1600 for wireless communication. The apparatus 1600 may be a network device (e.g., network device 130, base station 110), or a network device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, network node, or another wireless communication device) using the reception component 1602 and the transmission component 1604. As further shown, the apparatus 1600 may include the communication manager 150. The communication manager 150 may include an activation component 1608 and/or a bundling component 1610, among other examples.

In some aspects, the apparatus 1600 may be configured to perform one or more operations described herein in connection with FIGS. 1-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the network device described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network device described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network device described in connection with FIG. 2. In some aspects, the transmission component 1604 may be co-located with the reception component 1602 in a transceiver.

The reception component 1602 may receive, from a first UE, a request for the network device to establish a resource bundle, of resources to be used at hops in a TSN bridge for TSN communications to a second UE, with a maximum latency for the TSN bridge. The activation component 1608 may activate the resources of the resource bundle.

The bundling component 1610 may configure the resources of the resource bundle, via radio resource control signaling, to set up the resource bundle. The bundling component 1610 may configure the resource bundle to be a virtual resource bundle by mapping one or more of the resources of the resource bundle to one or more virtual resources of the virtual resource bundle, where the activating the resources of the resource bundle includes activating the one or more virtual resources of the virtual resource bundle.

The reception component 1602 may receive a MAC CE indicating a virtual resource to activate, where the activating the one or more virtual resources of the virtual resource bundle includes activating the virtual resource based at least in part on the MAC CE.

The transmission component 1604 may transmit a cancellation message to one or more nodes associated with the resource bundle via a MAC CE or group DCI. The transmission component 1604 may transmit, to the first UE, a message to adjust transmission of the TSN communications with respect to the maximum latency of the TSN bridge.

The bundling component 1610 may configure the resource bundle with a timer such that the resource bundle terminates upon expiration of the timer.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a first user equipment (UE), comprising: transmitting a request for a network device to establish a resource bundle, of resources to be used by nodes at hops in a time sensitive networking (TSN) bridge for TSN communications to a second UE, with a maximum latency for the TSN bridge; and transmitting the TSN communications to the second UE via the TSN bridge.

Aspect 2: The method of Aspect 1, wherein the resource bundle identifies a pair of consecutive nodes for each hop and a timing for a resource used between the pair of consecutive nodes.

Aspect 3: The method of Aspect 1 or 2, wherein the transmitting the request includes transmitting the request via a medium access control control element (MAC CE).

Aspect 4: The method of any of Aspects 1-3, wherein the transmitting the request includes transmitting the request via radio resource control signaling.

Aspect 5: The method of any of Aspects 1-4, further comprising: receiving a message to adjust transmission of the TSN communications; and adjusting the transmission of the TSN communications based at least in part on the message.

Aspect 6: A method of wireless communication performed by a network device, comprising: receiving, from a first user equipment (UE), a request for the network device to establish a resource bundle, of resources to be used at hops in a time sensitive networking (TSN) bridge for TSN communications to a second UE, with a maximum latency for the TSN bridge; and activating the resources of the resource bundle.

Aspect 7: The method of Aspect 6, wherein the resource bundle identifies a pair of consecutive nodes for each hop and a timing for a resource used between each pair of consecutive nodes.

Aspect 8: The method of Aspect 7, wherein the resource used between each pair of consecutive nodes includes a configured grant instance or a semi-persistent scheduling instance.

Aspect 9: The method of Aspect 7 or 8, wherein the timing for the resource used between each pair of consecutive resources includes a starting time for use of the resource.

Aspect 10: The method of any of Aspects 7-9, wherein the timing is based at least in part on one or more of a periodicity, a priority level, a logical channel restriction, or an application level end-to-end maximum latency.

Aspect 11: The method of any of Aspects 7-10, wherein a resource used between a given pair of consecutive nodes includes one or more physical resource blocks associated with power control parameters or a redundancy level.

Aspect 12: The method of any of Aspects 7-11, wherein a resource used between a given pair of consecutive nodes includes one or more physical resource blocks associated with a configured grant timer value that contributes to the maximum latency.

Aspect 13: The method of any of Aspects 7-12, wherein a resource used between a given pair of consecutive nodes includes one or more physical resource blocks associated with a modulation and coding scheme.

Aspect 14: The method of any of Aspects 7-13, wherein a resource used between a given pair of consecutive nodes includes one or more physical resource blocks associated with a hybrid automatic repeat request process.

Aspect 15: The method of any of Aspects 6-14, further comprising configuring the resources of the resource bundle, via radio resource control signaling, to set up the resource bundle.

Aspect 16: The method of any of Aspects 6-15, further comprising configuring the resource bundle to be a virtual resource bundle by mapping one or more of the resources of the resource bundle to one or more virtual resources of the virtual resource bundle, wherein the activating the resources of the resource bundle includes activating the one or more virtual resources of the virtual resource bundle.

Aspect 17: The method of Aspect 16, wherein the activating the one or more virtual resources of the virtual resource bundle includes multiplexing the TSN communications on a resource mapped to a virtual resource.

Aspect 18: The method of Aspect 16 or 17, further comprising receiving a medium access control control element (MAC CE) indicating a virtual resource to activate, wherein the activating the one or more virtual resources of the virtual resource bundle includes activating the virtual resource based at least in part on the MAC CE.

Aspect 19: The method of any of Aspects 6-18, wherein the receiving the request includes receiving the request via a medium access control control element (MAC CE).

Aspect 20: The method of any of Aspects 6-18, wherein the activating the resources of the resource bundle includes jointly activating the resources via downlink control information.

Aspect 21: The method of any of Aspects 6-20, wherein the receiving the request includes receiving the request via radio resource control signaling from the first UE or from another node in the TSN bridge.

Aspect 22: The method of any of Aspects 6-21, wherein the activating the resources of the resource bundle includes transmitting a medium access control control element (MAC CE) to one or more nodes associated with the resource bundle.

Aspect 23: The method of any of Aspects 6-21, wherein the activating the resources of the resource bundle includes transmitting downlink control information (DCI) or group DCI to one or more nodes associated with the resource bundle.

Aspect 24: The method of any of Aspects 6-23, further comprising transmitting a cancellation message to one or more nodes associated with the resource bundle via a medium access control control element (MAC CE) or group downlink control information.

Aspect 25: The method of any of Aspects 6-24, further comprising transmitting, to the first UE, a message to adjust transmission of the TSN communications with respect to the maximum latency of the TSN bridge.

Aspect 26: The method of any of Aspects 6-25, further comprising configuring the resource bundle with a timer such that the resource bundle terminates upon expiration of the timer.

Aspect 27: The method of any of Aspects 6-26, wherein one or more of the resources of the resource bundle include a sidelink grant.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors coupled to the one or more memories, the one or more memories storing instructions configurable to be executed by the one or more processors to cause the first UE to:
   transmit a request for a network device to establish a resource bundle by jointly provisioning a configured grant instance and a semi-persistent scheduling instance to be used by different pairs of consecutive nodes at different hops in a time sensitive networking (TSN) bridge for TSN communications to a second UE, with a maximum latency for the TSN bridge; and
   transmit the TSN communications to the second UE via the TSN bridge.

2. The first UE of claim 1, wherein the resource bundle identifies a pair of consecutive nodes for each hop and a timing for a resource used between the pair of consecutive nodes.

3. The first UE of claim 1, wherein the instructions configurable to be executed, when transmitting the request, are further executable by the one or more processors to cause the first UE to:

transmit the request via a medium access control control element (MAC CE).

4. The first UE of claim 1, wherein the instructions configurable to be executed, when transmitting the request, are further executable by the one or more processors to cause the first UE to:
   transmit the request via radio resource control signaling.

5. The first UE of claim 1, wherein the instructions are further configurable to be executed by the one or more processors to cause the first UE to:
   receive a message to adjust transmission of the TSN communications; and
   adjust the transmission of the TSN communications based at least in part on the message.

6. The first UE of claim 1, wherein:
   the configured grant instance comprises resources for a first hop in the TSN bridge from the first UE to the network device; and
   the semi-persistent scheduling instance comprises resources for a second hop to the second UE.

7. A network device for wireless communication, comprising:
   one or more memories; and
   one or more processors coupled to the one or more memories, the one or more memories storing instructions configurable to be executed by the one or more processors to cause the network device to:
      receive, from a first user equipment (UE), a request for the network device to establish a resource bundle by jointly provisioning a configured grant instance and a semi-persistent scheduling instance to be used by different pairs of consecutive nodes at different hops in a time sensitive networking (TSN) bridge for TSN communications to a second UE, with a maximum latency for the TSN bridge; and
      activate the configured grant instance and the semi-persistent scheduling instance of the resource bundle.

8. The network device of claim 7, wherein the resource bundle identifies a pair of consecutive nodes for each hop and a timing for each resource used between each pair of consecutive nodes.

9. The network device of claim 8, wherein the timing for the resource used between each pair of consecutive resources includes a starting time for use of the resource.

10. The network device of claim 8, wherein the timing is based at least in part on one or more of a periodicity, a priority level, a logical channel restriction, or an application level end-to-end maximum latency.

11. The network device of claim 8, wherein a resource used between a given pair of consecutive nodes includes one or more physical resource blocks associated with power control parameters or a redundancy level.

12. The network device of claim 8, wherein a resource used between a given pair of consecutive nodes includes one or more physical resource blocks associated with a configured grant timer value that contributes to the maximum latency.

13. The network device of claim 8, wherein a resource used between a given pair of consecutive nodes includes one or more physical resource blocks associated with a modulation and coding scheme.

14. The network device of claim 8, wherein a resource used between a given pair of consecutive nodes includes one or more physical resource blocks associated with a hybrid automatic repeat request process.

15. The network device of claim 7, wherein the instructions are further configurable to be executed by the one or more processors to cause the network device to:
   configure resources of the resource bundle, via radio resource control signaling, to set up the resource bundle.

16. The network device of claim 7, wherein the instructions are further configurable to be executed by the one or more processors to cause the network device to:
   configure the resource bundle to be a virtual resource bundle by mapping one or more physical resources of the resource bundle to one or more virtual resources of the virtual resource bundle, wherein the instructions configurable to be executed, when activating the configured grant instance and the semi-persistent scheduling instance of the resource bundle, are further executable by the one or more processors to cause the network device to:
      activate the one or more virtual resources of the virtual resource bundle.

17. The network device of claim 16, wherein the instructions configurable to be executed, when activating the one or more virtual resources of the virtual resource bundle, are further executable by the one or more processors to cause the network device to:
   multiplex the TSN communications on a physical resource mapped to a virtual resource.

18. The network device of claim 16, wherein the instructions are further configurable to be executed by the one or more processors to cause the network device to:
   receive a medium access control control element (MAC CE) indicating a virtual resource to activate, wherein the instructions configurable to be executed, when activating the one or more virtual resources of the virtual resource bundle, are further executable by the one or more processors to cause the network device to:
      activate the virtual resource based at least in part on the MAC CE.

19. The network device of claim 7, wherein the instructions configurable to be executed, when receiving the request, are further executable by the one or more processors to cause the network device to:
   receive the request via a medium access control control element (MAC CE).

20. The network device of claim 7, wherein the instructions configurable to be executed, when activating the configured grant instance and the semi-persistent scheduling instance of the resource bundle, are further executable by the one or more processors to cause the network device to:
   jointly activate the configured grant instance and the semi-persistent scheduling instance via downlink control information.

21. The network device of claim 7, wherein the instructions configurable to be executed, when receiving the request, are further executable by the one or more processors to cause the network device to:
   receive the request via radio resource control signaling from the first UE or from another node in the TSN bridge.

22. The network device of claim 7, wherein the instructions configurable to be executed, when activating the configured grant instance and the semi-persistent scheduling instance of the resource bundle, are further executable by the one or more processors to cause the network device to:
   transmit a medium access control control element (MAC CE) to one or more nodes associated with the resource bundle.

23. The network device of claim 7, wherein the instructions configurable to be executed, when activating the configured grant instance and the semi-persistent scheduling instance of the resource bundle, are further executable by the one or more processors to cause the network device to:
transmit downlink control information (DCI) or group DCI to one or more nodes associated with the resource bundle.

24. The network device of claim 7, wherein the instructions are further configurable to be executed by the one or more processors to cause the network device to:
transmit a cancellation message to one or more nodes associated with the resource bundle via a medium access control control element (MAC CE) or group downlink control information.

25. The network device of claim 7, wherein the instructions are further configurable to be executed by the one or more processors to cause the network device to:
transmit, to the first UE, a message to adjust transmission of the TSN communications with respect to the maximum latency of the TSN bridge.

26. The network device of claim 7, wherein the instructions are further configurable to be executed by the one or more processors to cause the network device to:
configure the resource bundle with a timer such that the resource bundle terminates upon expiration of the timer.

27. The network device of claim 7, wherein one or more resources of the resource bundle include a sidelink grant.

28. A method of wireless communication performed by a first user equipment (UE), comprising:
transmitting a request for a network device to establish a resource bundle by jointly provisioning a configured grant instance and a semi-persistent scheduling instance to be used by different pairs of consecutive nodes at different hops in a time sensitive networking (TSN) bridge for TSN communications to a second UE, with a maximum latency for the TSN bridge; and
transmitting the TSN communications to the second UE via the TSN bridge.

29. The method of claim 28, wherein the resource bundle identifies a pair of consecutive nodes for each hop and a timing for a resource used between the pair of consecutive nodes.

30. A method of wireless communication performed by a network device, comprising:
receiving, from a first user equipment (UE), a request for the network device to establish a resource bundle by jointly provisioning a configured grant instance and a semi-persistent scheduling instance to be used by different pairs of consecutive nodes at different hops in a time sensitive networking (TSN) bridge for TSN communications to a second UE, with a maximum latency for the TSN bridge; and
activating resources of the resource bundle.

* * * * *